US012734644B2

(12) United States Patent
Sawizki et al.

(10) Patent No.: US 12,734,644 B2
(45) Date of Patent: Sep. 15, 2026

(54) CLAMP WITH ROTATABLE ADVANCEMENT APPARATUS

(71) Applicant: BESSEY Tool GmbH & Co. KG, Bietigheim-Bissingen (DE)

(72) Inventors: Valentin Sawizki, Erlenbach (DE); Gerhard Kloepfer, Pleidelsheim (DE)

(73) Assignee: BESSEY Tool GmbH & Co. KG, Bietigheim-Bissingen (DE)

(*) Notice: Subject to any disclaimer, the term of this patent is extended or adjusted under 35 U.S.C. 154(b) by 303 days.

(21) Appl. No.: 18/657,971

(22) Filed: May 8, 2024

(65) Prior Publication Data

US 2024/0375249 A1 Nov. 14, 2024

Related U.S. Application Data

(63) Continuation of application No. PCT/EP2022/081422, filed on Nov. 10, 2022.

(30) Foreign Application Priority Data

Nov. 19, 2021 (DE) ..................... 10 2021 130 286.2

(51) Int. Cl.
*B25B 5/06* (2006.01)
*B25B 5/02* (2006.01)

(52) U.S. Cl.
CPC ................ *B25B 5/068* (2013.01); *B25B 5/02* (2013.01)

(58) Field of Classification Search
CPC ........... B25B 5/068; B25B 5/02; B25B 5/163; B25B 5/06; B25B 5/166; B25B 5/085; B25B 5/102; B25B 5/127
See application file for complete search history.

(56) References Cited

U.S. PATENT DOCUMENTS

| | | | |
|---|---|---|---|
| 3,096,975 | A | 7/1963 | Irwin |
| 4,185,811 | A | 1/1980 | Long |
| 4,257,584 | A | 3/1981 | Sterling |
| 4,989,847 | A | 2/1991 | Chapman |
| 5,096,170 | A | 3/1992 | Albin |

(Continued)

FOREIGN PATENT DOCUMENTS

| | | |
|---|---|---|
| CA | 2304718 | 2/1999 |
| DE | 3917473 | 2/1990 |

(Continued)

*Primary Examiner* — Jason L Vaughan
*Assistant Examiner* — Amanda Kreiling
(74) *Attorney, Agent, or Firm* — Lipsitz & McAllister, LLC

(57) ABSTRACT

A clamp is provided, said clamp comprising a clamp bar, a fixed jaw which is located at the clamp bar, a counter jaw relative to which the clamp bar is displaceable, an advancement apparatus on which the clamp bar is displaceably supported and to which the counter jaw is connected in translationally fixed relation, an actuating device which is arranged at the advancement apparatus and by way of which displacement of the clamp bar in an advance direction is actuatable, and a blocking apparatus by way of which displacement of the clamp bar in a counter direction to the advance direction can be blocked, wherein the actuating device is rotatable relative to the clamp bar and is rotatable relative to the blocking apparatus, and wherein the blocking apparatus is rotationally fixed relative to the clamp bar.

34 Claims, 11 Drawing Sheets

(56) References Cited

U.S. PATENT DOCUMENTS

| | | | | |
|---|---|---|---|---|
| 5,170,682 | A * | 12/1992 | Sorensen | B25B 5/068 81/487 |
| 5,215,288 | A | 6/1993 | Lyon | |
| 5,593,147 | A | 1/1997 | Read | |
| 5,853,168 | A | 12/1998 | Drake | |
| 6,152,434 | A | 11/2000 | Gluck | |
| 6,575,442 | B2 | 6/2003 | Klimach et al. | |
| 6,601,837 | B2 | 8/2003 | Klimach et al. | |
| 6,736,371 | B1 | 5/2004 | Burrows | |
| 7,226,046 | B2 | 6/2007 | Kloepfer et al. | |
| 11,192,191 | B2 | 12/2021 | Forbes et al. | |
| 2003/0030205 | A1 | 2/2003 | Klimach et al. | |
| 2006/0049563 | A1 | 3/2006 | Kloepfer et al. | |
| 2013/0134642 | A1 * | 5/2013 | Chen | B25B 5/166 269/6 |

FOREIGN PATENT DOCUMENTS

| | | |
|---|---|---|
| DE | 9116235 | 9/1992 |
| DE | 29603811 | 5/1996 |
| DE | 19731579 | 1/1999 |
| DE | 29908240 | 10/1999 |
| DE | 29919066 | 2/2000 |
| GB | 2221641 | 2/1990 |
| WO | 0156746 | 8/2001 |
| WO | 2020159798 | 8/2020 |

* cited by examiner

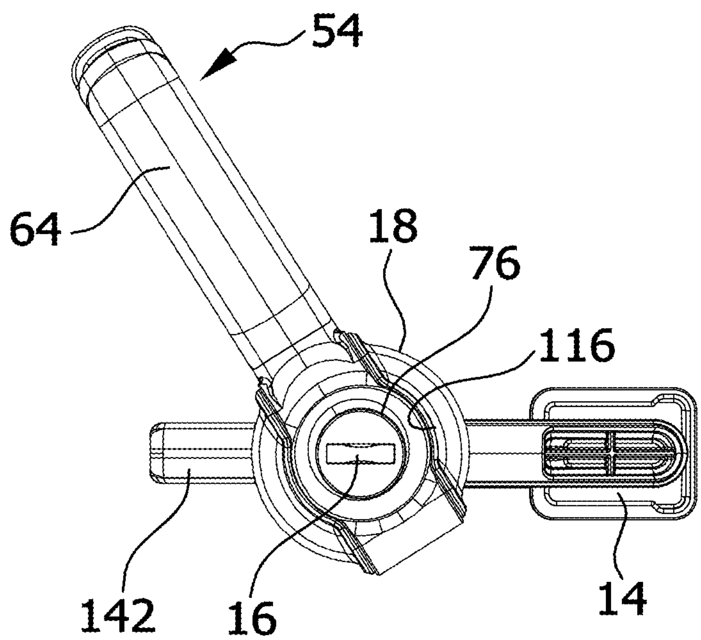
FIG.6
FIG.7
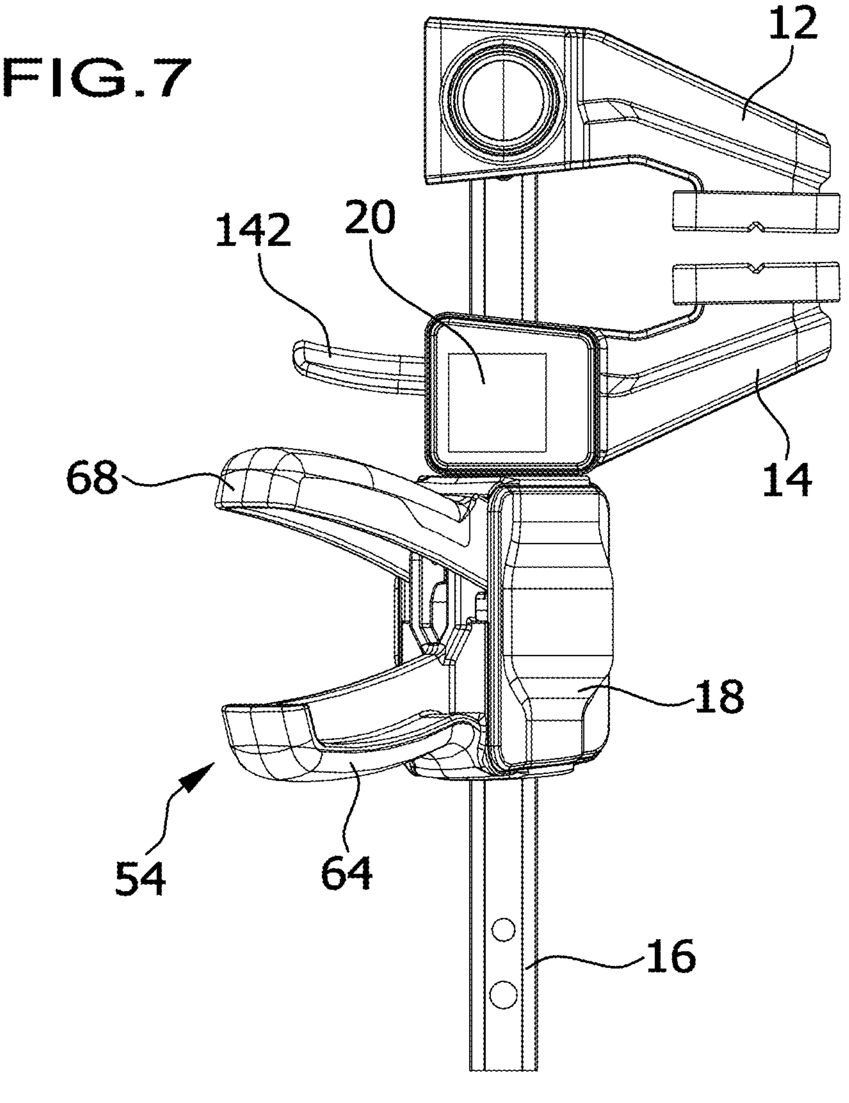

CLAMP WITH ROTATABLE ADVANCEMENT APPARATUS

This application is a continuation of international application number PCT/EP2022/081422 filed on Nov. 10, 2022 and claims the benefit of German application No. 10 2021 130 286.2 of Nov. 19, 2021, which are incorporated herein by reference in their entirety and for all purposes.

BACKGROUND OF THE INVENTION

The invention relates to a clamp comprising a clamp bar, a fixed jaw which is located at the clamp bar, a counter jaw relative to which the clamp bar is displaceable, an advancement apparatus on which the clamp bar is displaceably supported and to which the counter jaw is connected in translationally fixed relation, an actuating device which is arranged at the advancement apparatus and by way of which displacement of the clamp bar in an advance direction can be actuated, and a blocking apparatus by way of which displacement of the clamp bar in a counter direction to the advance direction can be blocked.

US 2006/0049563 A1 discloses an extension for a clamp.

WO 01/56746 A1 discloses a clamping device comprising a clamp bar which is displaceably guided in its longitudinal direction and an actuating device which comprises a grip element by way of which the clamp bar can be displaced. A first contact element and a second contact element are held to the clamp bar. The clamp bar is displaceable relative to the first contact element, and the first contact element is rotatable relative to the actuating device.

SUMMARY OF THE INVENTION

In accordance with an exemplary embodiment of the invention, a clamp is provided that has extensive operating possibilities.

In accordance with an exemplary embodiment of the invention, the clamp comprises a clamp bar, a fixed jaw which is located at the clamp bar, a counter jaw relative to which the clamp bar is displaceable, an advancement apparatus on which the clamp bar is displaceably supported and to which the counter jaw is connected in translationally fixed relation, an actuating device which is arranged at the advancement apparatus and by way of which displacement of the clamp bar in an advance direction can be actuated, and a blocking apparatus by way of which displacement of the clamp bar in a counter direction to the advance direction can be blocked, wherein the actuating device is rotatable relative to the clamp bar and is rotatable relative to the blocking apparatus, and wherein the blocking apparatus is rotationally fixed relative to the clamp bar.

In an exemplary embodiment of the clamp in accordance with the invention, it is possible for the actuating device via which an operator actuates the clamp to be brought into a rotational position relative to the clamp bar that is appropriate for the particular application.

The blocking apparatus does not co-rotate with such rotation, because of its rotationally fixed arrangement. The blocking apparatus maintains its position with respect to said rotatability.

The advancement apparatus can thereby be separate from the blocking apparatus. In particular, it is thereby possible for the advancement apparatus to be actuated in each rotational position of the actuating device relative to the clamp bar in order to effect an advancement of the clamping rail.

The clamp can thereby be optimally tailored for use in the particular application, and the actuating device can be positioned by rotation thereof in such a way that optimized accessibility for an operator results. The actuation device can be positioned by an operator in such a manner that it does not collide with elements of the application that would otherwise interfere therewith.

Here, the actuating device is rotatable relative to the fixed jaw and is in particular also rotatable relative to the counter jaw.

It is advantageous for the blocking apparatus to be connected to the advancement apparatus in translationally fixed relation thereto and for the clamp bar to be displaceable relative to the blocking apparatus. The clamp bar can thereby be supported for displacement on the combination of blocking apparatus and advancement apparatus. This provides a simple way of realizing the advance action of the advancement apparatus and the blocking action of the blocking apparatus. The advancement apparatus can be rotated relative to the blocking apparatus.

For the same reason, it is advantageous for the clamp bar to be displaceably supported on the blocking apparatus. This provides a simple way of realizing the blocking function of the blocking apparatus.

It is advantageous for at least one of the following to be provided:

- in a clamping function, the blocking apparatus is positioned between the fixed jaw and the advancement apparatus;
- in a spreading function, the advancement apparatus is positioned between the blocking apparatus and the fixed jaw.

Simple construction is achieved if, for the clamping function, the blocking apparatus is positioned between the fixed jaw and the advancement apparatus. In particular, this arrangement allows, over at least a certain range of rotational positions of the actuating device relative to the clamp bar, the blocking apparatus to be operated by the same holding hand that operates the actuating device or that holds the clamp by the actuating device. In particular, one-handed operation is thereby enabled.

A spreading function can be realized in a simple manner if the fixed jaw is arranged correspondingly.

In an advantageous embodiment, the counter jaw is located at the blocking apparatus, in particular with at least one of the following:

- the counter jaw is located at the blocking apparatus in translationally fixed relation thereto;
- the counter jaw is located at the blocking apparatus in rotationally fixed relation thereto.

It is thereby possible to realize a clamp using simple structure. The number of component parts required can be minimized. Therefore, the weight of the clamp can also be minimized. Furthermore, in particular, a capability for one-handed operation is simple to realize. In particular, the counter jaw is aligned with the fixed jaw, and the only possible relative movement between the counter jaw and the fixed jaw is linear displacement.

It is advantageous from a construction perspective for a region of the advancement apparatus in which the actuating device is arranged to be supported for rotation on the clamp bar. This provides a simple way of realizing a rotatability of the actuating device. Furthermore, it is easily implemented that an advance of the clamp bar can be effected at each rotational position of the actuating device via the advancement apparatus. This is achieved, for example, by arranging, at the advancement apparatus, an advance element or an advance element pack in rotationally fixed relation with respect to the clamp bar and allowing the part of the advancement apparatus at which the actuating device is arranged to rotate relative to said advance element or advance element pack.

In an advantageous embodiment from a construction perspective, a housing of the advancement apparatus is rotatably supported on the clamp bar. The actuating device is arranged at the housing. A user is thereby given extensive operating possibilities.

In an advantageous embodiment from a construction perspective, the advancement apparatus is rotatably supported in at least a portion thereof on the blocking apparatus. In particular, a connecting device between the advancement apparatus and the blocking apparatus for connecting these two in translationally fixed relation to one another can thereby be configured as a rotary bearing.

It is advantageous for a rotational axis of the rotatability of the actuating device relative to the clamp bar to be parallel to the advance direction. This results in extensive operating possibilities.

It is possible for a rotary bearing for the rotatability of the actuating device relative to the clamp bar to be of stepless configuration or to have a plurality of discrete steps, and to have latching steps in particular. With a stepless configuration, any desired angle of rotation can be adjusted. For example, spring loading provides a corresponding force-locking connection in order to hold an adjusted rotational position. Where a plurality of discrete steps, and latching steps in particular, are provided, an adjusted rotational position can be held simply by way of a form-locking connection. In this way, the actuating device can be prevented from "rotating out" of an adjusted rotational position, because of its own weight.

It is advantageous if at least one of the following is provided:

- a housing of the advancement apparatus is supported for rotation about a first rotational axis on the clamp bar via a first rotary bearing;
- a housing of the advancement apparatus is supported for rotation about a second rotational axis on the blocking apparatus via a second rotary bearing;
- the first rotational axis and the second rotational axis are coaxial.

Thus, by way of the first rotary bearing and the second rotary bearing, a rotary bearing which is of simple construction can be realized to provide the rotatability of the actuating device relative to the clamp bar. The rotary bearing can be formed over a large proportion of length relative to the clamp bar so that a high degree of stability or rigidity can be achieved. In particular, the clamp bar is displaceably supported on both the advancement apparatus and the blocking apparatus. A rotatability of the actuating device can then be realized, in a simple construction, via the rotatability of the housing of the advancement apparatus relative to the clamp bar.

In an exemplary embodiment, the first rotary bearing comprises a first sleeve having a first opening, wherein the clamp bar is passed through the first opening and is linearly displaceably and rotationally fixedly supported on the sleeve and wherein the first sleeve is located at the housing. This provides a simple way of realizing, via the first sleeve, a rotary bearing in which, in particular, the housing forms an outer shaft. The first sleeve is then both a linear guide for the clamp bar and part of the rotary bearing for the rotatability of the housing.

In an embodiment, the first sleeve is associated with a counter element that engages the first sleeve to form discrete rotational positions, wherein (i) the first sleeve comprises a latching rim, or (ii) the counter element comprises a latching rim. When correspondingly configured, discrete rotational positions can then be adjusted and secured.

In particular, it is advantageous for the first sleeve to be at least partially arranged in the housing. This makes for a compact construction. A simple way is provided to realize an outer shaft via the housing.

It is further advantageous for the second rotary bearing to comprise a second sleeve having a second opening, wherein the clamp bar is passed through the second opening and is linearly displaceably and rotationally fixedly supported on the second sleeve. Both a rotary bearing for the rotatability of the actuating device relative to the clamp bar and a displacement bearing for the clamp bar can be realized via the second sleeve. For example, the second sleeve forms an inner shaft, or the second sleeve cooperates with a counter element of the housing, which latter is then an outer shaft.

Here, to form discrete rotational positions, provision can be made for the second sleeve to have associated therewith a counter element which engages the second sleeve for forming discrete rotational positions, wherein (i) the second sleeve comprises a latching rim, or (ii) the counter element comprises a latching rim. In particular, here, a corresponding anti-rotation device for realizing discrete rotational positions can be provided both on the first sleeve and on the second sleeve, or only on the first sleeve, or on only on the second sleeve.

Here, it is possible for the second sleeve (i) to be arranged at the blocking apparatus and to be entered in a housing of the advancement apparatus, or (ii) to be arranged at a housing of the advancement apparatus and to be entered in a recess of the blocking apparatus. In the first case, (i), the housing of the advancement apparatus forms an outer shaft. In the second case, (ii), the second sleeve forms an inner shaft. This results in a stable configuration with a rotary bearing that is minimized with respect to tilting moments and the like.

It is advantageous for the advancement apparatus to comprise at least one advance element on which the actuating device acts, wherein the at least one advance element is rotationally fixed relative to the clamp bar. This gives simplicity of construction. In a sense, the conventional solution with advance element can be used for the advance of the clamp bar. It is then easily possible to provide a rotatability of the actuating device, in particular in that a housing of the advancement apparatus in which the at least one advance element is located and at which the actuating device is arranged is rotatable about the at least one advance element.

It is then particularly advantageous for the at least one advance element to comprise an engagement surface for the actuating device, which engagement surface is formed in the shape of a ring, and is formed in the shape of a circular ring in particular. The actuating device can thereby act on the at least one advance element in each rotational position of the actuating device in order to effect an advance of the clamp bar. This means that, for example, a clamping action via the actuating device is independent of the rotational position of the actuating device relative to the clamp bar.

For the same reason, it is advantageous if the engagement surface for the actuating device surrounds the clamp bar in a ring shape. The actuating device can then act on the at least one advance element in each rotational position of the actuating device relative to the clamp bar in order to effect an advance of the clamp bar.

It is advantageous for the at least one advance element to have a through-opening through which the clamp bar is passed in rotationally fixed relation thereto. This provides a simple way of achieving an advance movement.

It is advantageous for the at least one advance element to be positioned in a housing of the advancement apparatus. This makes for a protected arrangement.

It is advantageous for an advance element pack having a plurality of advance elements to be provided, in particular wherein adjacent advance elements are in contact with one another. A high clamping force or spreading force can thereby be achieved.

In an advantageous embodiment from a construction perspective, the actuating device comprises an actuating lever which can be pivoted about a pivot axis, in particular with at least one of the following:

the pivot axis is oriented transversely and in particular perpendicularly to the advance direction;

the pivot axis is oriented transversely and in particular perpendicularly to a rotational axis of the rotational mobility of the advancement apparatus relative to the clamp bar.

This allows for ease of operation. An operator can hold and operate the clamp via the actuating device. In particular, a one hand operated clamp can be realized, i.e., a clamp which provides the capability for one hand operation.

Advantageously, the actuating device has a stationary holding element in spaced apart relation to the actuating lever. The stationary holding element is a grip element for an operator's hand. An operator can hold the clamp by the holding element. Furthermore, the operator's holding hand can be supported on the holding element in order to pivot the actuating lever.

In an advantageous embodiment from a construction perspective, the advancement apparatus comprises at least one advance element which is engaged by the actuating lever, wherein, starting from an initial position of the at least one advance element, upon engagement by the actuating lever, the at least one advance element is inclined to the clamp bar with canting of the at least one advance element relative to the clamp bar, and the clamp bar is driven in linear displacement in the advance direction. This provides a simple way of achieving linear advancement of the clamp bar via pivoting of the actuating lever, and a corresponding clamping force or spreading force can be exerted. In particular, an eccentric arrangement is provided to convert a corresponding pivoting movement into a linear movement.

In an advantageous embodiment, a spring device is provided which is supported on the at least one advance element, wherein a spring force of the spring device attempts to bring or hold the at least one advance element in its initial position relative to the clamp bar. This provides a simple way of effecting an advance action by actuating the actuating lever (against the action of the spring force of the spring device). When an operator releases the actuating lever, the at least one advance element returns to its initial position, and the actuating lever also returns to its initial position. Another advance action can then be performed. It is also possible, via the spring device which is supported on the at least one advance element, for a rotational position of the actuating device relative to the clamp bar to be held in a force-locking manner. Here, in particular, provision is made for the spring device to be supported on a part of the advancement apparatus that is rotatable. (The at least one advance element, in particular, is not rotatable relative to the clamp bar.)

It is advantageous for the blocking apparatus to comprise a release element, and to comprise a release lever in particular, for releasing a blocking condition. An operator can then release the blocking condition via the release element and can then, in a sense, freely displace the clamp bar relative to the blocking apparatus and the advancement apparatus.

In an embodiment configured with simple structure, the blocking apparatus comprises at least one blocking element, and comprises a blocking element pack in particular, wherein the at least one blocking element has a through-opening through which the clamp bar is passed, and wherein in a blocking position of the at least one blocking element, the at least one blocking element is canted relative to the clamp bar. The blocking apparatus makes for a simple way of blocking a displaceability of the clamp bar in a direction opposite to that of the advance direction. This provides a simple way of achieving a clamping action or a spreading action between the fixed jaw and the counter jaw. Clamping or spreading can, in a sense, be achieved by a pumping action. Via the advancement apparatus, the clamp bar is "pumpingly" moved in the advance direction, wherein displacement in the counter direction is inhibited by the blocking apparatus.

It is advantageous for a spring device to be provided which is supported on the at least one blocking element, wherein a spring force of the spring device attempts to bring or hold the at least one blocking element in its blocking position. The position of the at least one blocking element is thereby the blocking position, with no operator intervention required. Displacement in the counter direction to the advance direction is thereby inhibited. Such blocking position can only be released by operator intervention, overcoming the spring force of the spring device in order, in particular, to enable free displaceability of the clamp bar.

In an advantageous embodiment from a construction perspective, a release element is provided which acts upon the at least one blocking element and via which an angular position of the at least one blocking element to the clamp bar can be adjusted. This provides a simple way of releasing the blocking position by correspondingly adjusting the angular position needed for that purpose.

It is advantageous for at least one of the following to be provided:

the fixed jaw is releasably located at the clamp bar;

a clamping function is provided in which the advance direction is a direction of movement of the fixed jaw towards the counter jaw;

a spreading function is provided in which the advance direction is a direction of movement of the fixed jaw away from the counter jaw;

the clamp bar has a plurality of fixing positions for the fixed jaw and, in particular, fixing positions are located in the area of opposing ends of the clamp bar.

This results in extended capabilities of use. In particular, starting from a clamping function, a spreading function can be realized by repositioning the fixed jaw at the clamp bar.

It is particularly advantageous for the clamp to be configured as a one hand operated clamp which can be held by the actuating device by one hand of an operator and in which an advance of the clamp bar is actuatable in the advance direction via the actuating device by the holding hand. This leaves the operator's other hand free to hold one or more workpieces or the like. The holding hand can also correspondingly rotate the actuating device to the desired position relative to the clamp bar.

It is advantageous for a release element of the blocking apparatus to be arranged and configured such that it can be operated, by the holding hand of an operator who is holding the clamp by the actuating device, in at least a non-rotated position. This results in simplified capabilities of use.

The following description of preferred embodiments serves in conjunction with the drawings to explain the invention in greater detail.

BRIEF DESCRIPTION OF THE DRAWINGS

FIG. 6 shows a rear view of the clamp of FIG. 2 (corresponding to the direction A of FIG. 1);

FIG. 7 shows a top plan view of the clamp of FIG. 2;

DETAILED DESCRIPTION OF THE INVENTION

Figure 1:
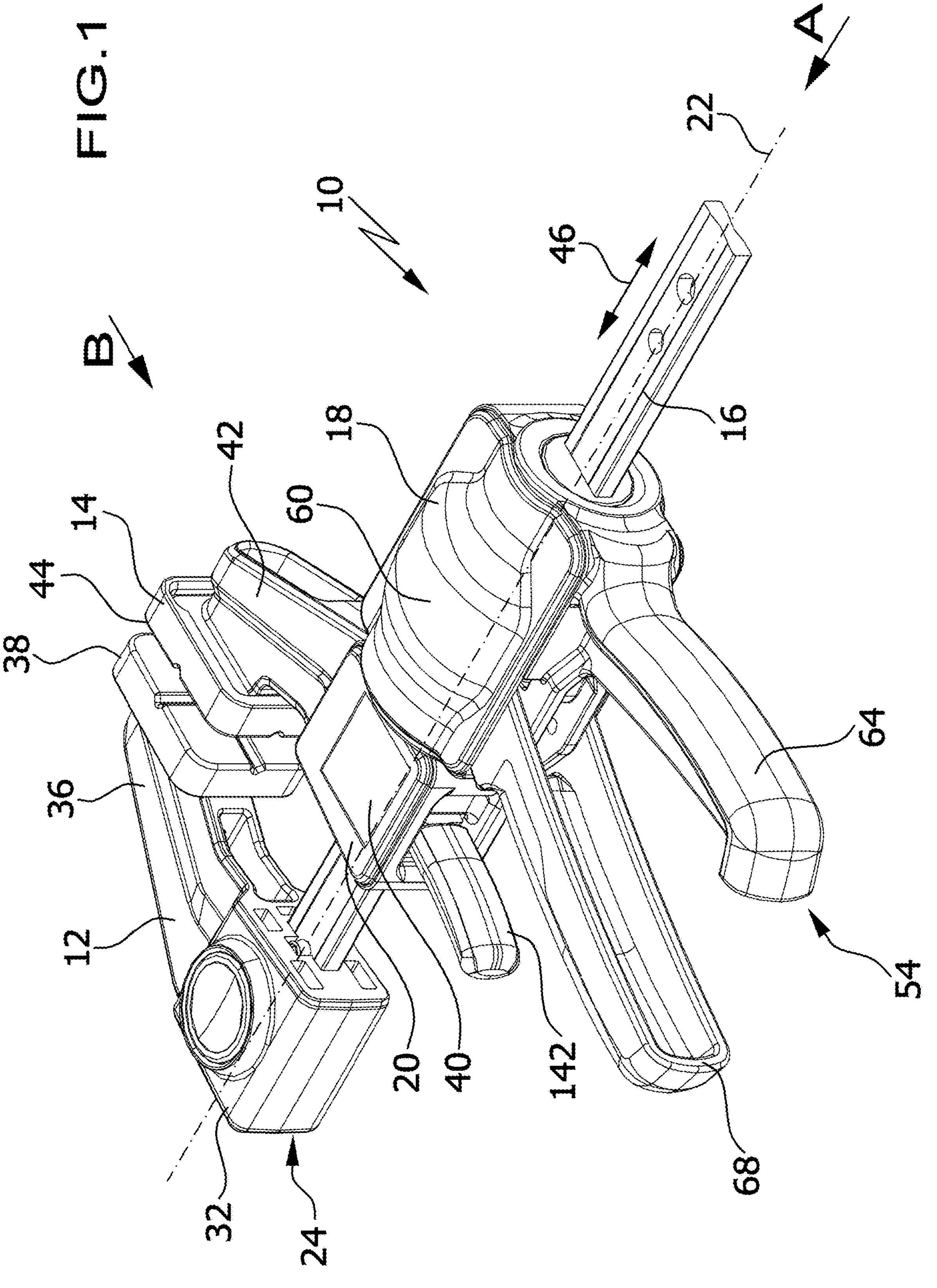
FIG. 1 shows a perspective representation of an exemplary embodiment of a clamp in accordance with the invention with an advancement apparatus in a first rotational position relative to a clamp bar.
Figure 2:
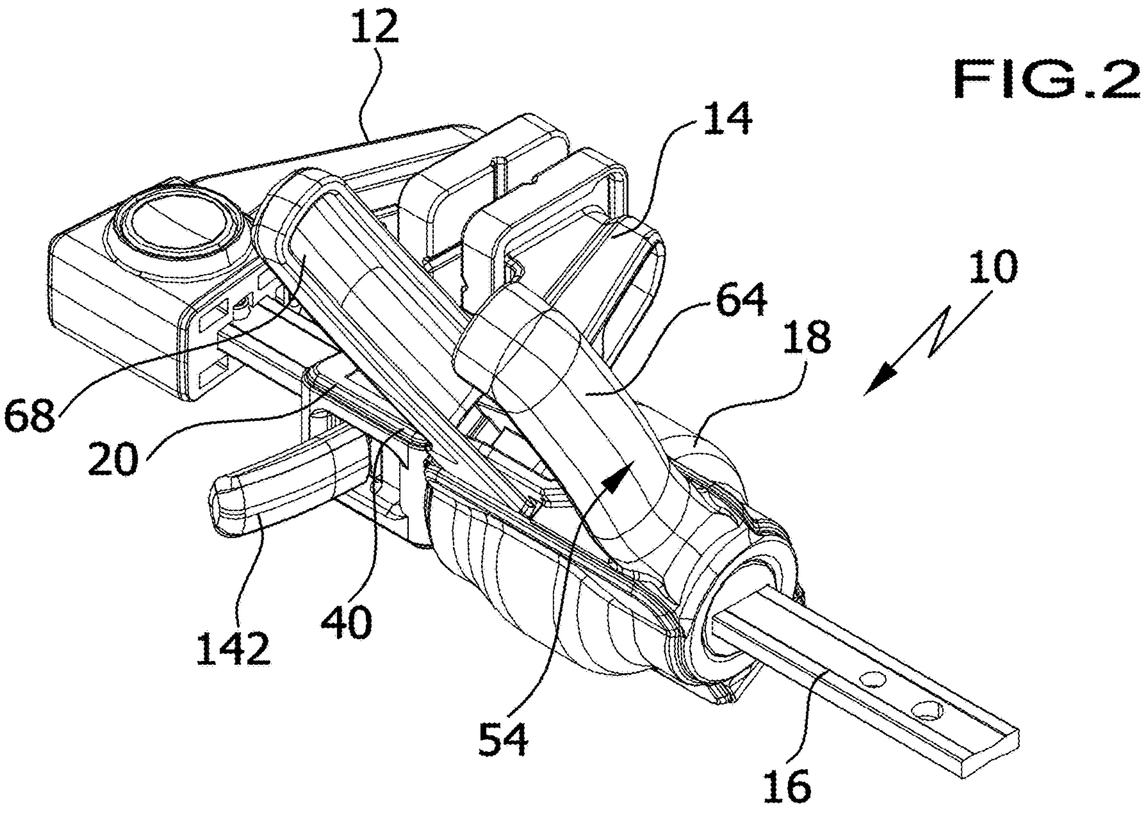
FIG. 2 shows the same view as FIG. 1 but with the advancement apparatus in a second rotational position relative to the clamp bar.
Figure 3:
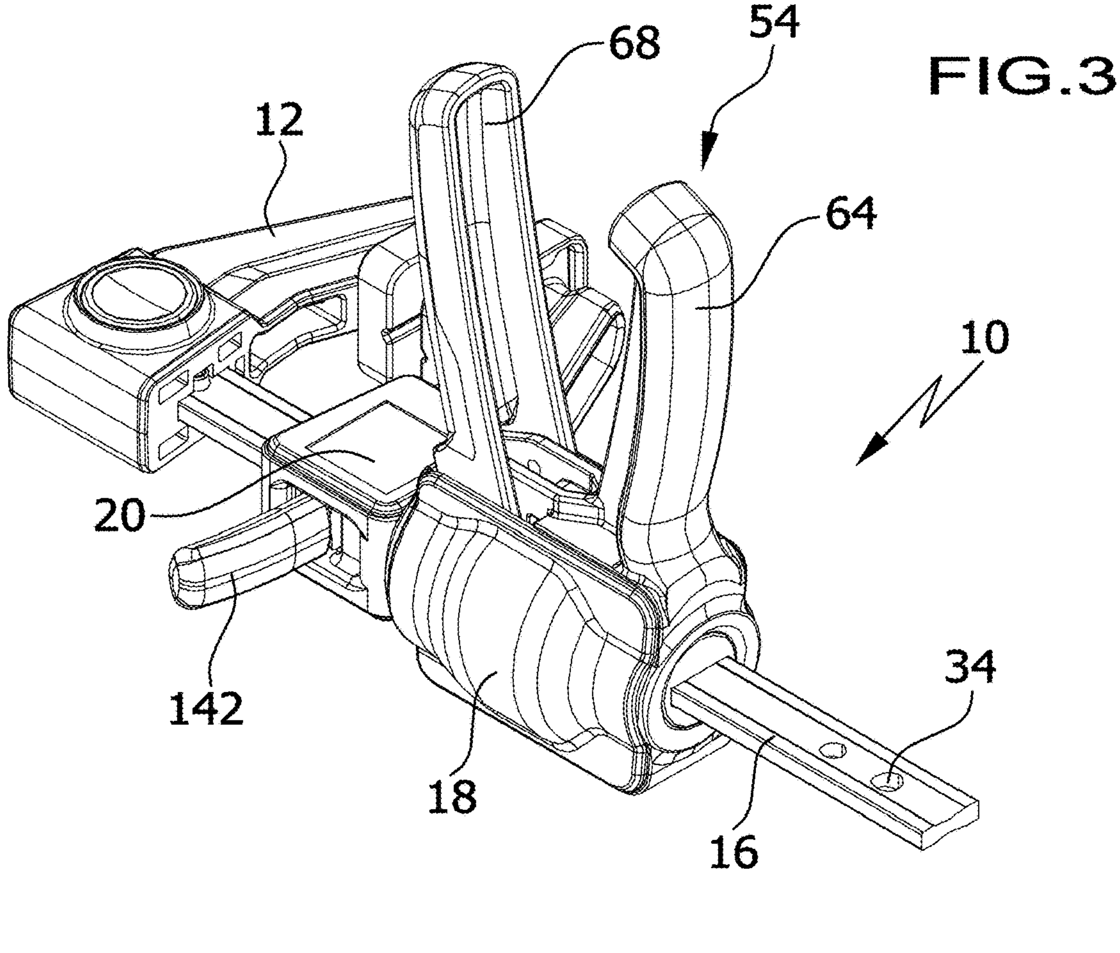
FIG. 3 shows the same view as FIG. 1 but with the advancement apparatus in a third rotational position relative to the clamp bar.
Figure 4:
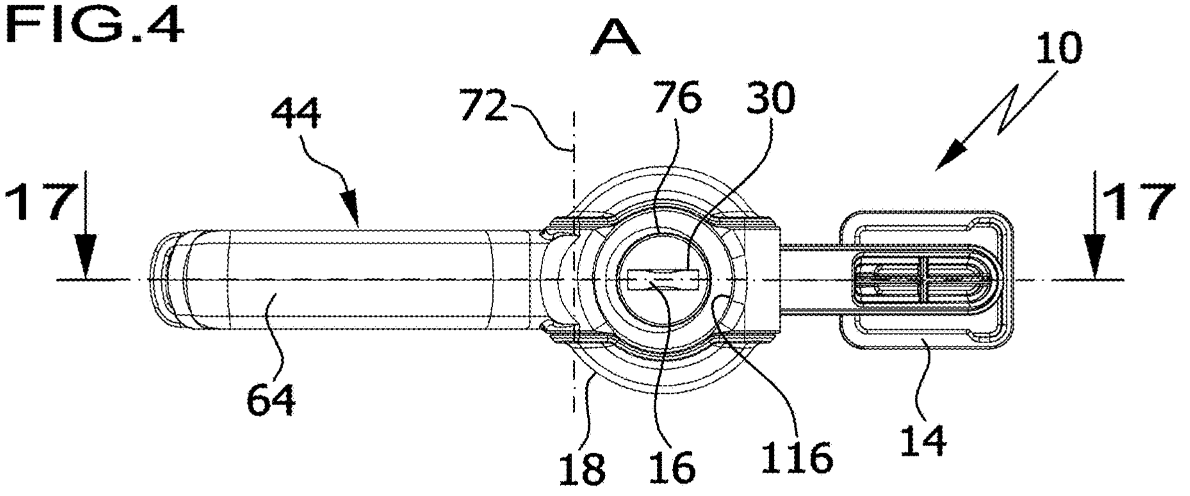
FIG. 4 shows a view in the direction A of FIG. 1.

An exemplary embodiment of a clamp in accordance with the invention, shown in FIGS. 1 to 22 and designated therein by 10, comprises, as essential components, a fixed jaw 12, a counter jaw 14 to the fixed jaw 12, a clamp bar 16, an advancement apparatus 18 and a blocking apparatus 20.

The clamp bar 16 extends along a longitudinal axis 22 and has a straight configuration.

In an exemplary embodiment, the clamp bar 16 is of rectangular envelope form in cross-section and may have rounded or chamfered edges. In particular, the clamp bar 16 is formed with a waisted profile (compare FIG. 1 and FIG. 16).

The clamp bar 16 is made of a metallic material, for example.

The fixed jaw 12 is fixedly (immovably) located at the clamp bar 16. It is possible in principle for the fixed jaw 12 to be non-releasably fixed to the clamp bar 16.

In an exemplary embodiment, which is illustrated in the figures, the fixed jaw 12 is releasably fixed to the clamp bar 16. It is thereby possible for the fixed jaw to be replaced or for the clamp 10 to be provided with a clamping function and a spreading function.

In particular, provision is made for the clamp bar 16 to comprise a plurality of fixing positions for the fixed jaw 12. In an exemplary embodiment, the clamp bar 16 comprises a first fixing position 24 for the fixed jaw 12, wherein the first fixing position 24 is in the area of a first end 26 of the clamp bar 16. Furthermore, a second fixing position 28 is provided which is located in the area of a second end 30 of the clamp bar 16 (compare, for example, FIG. 5). Here, the second end 30 is opposite the first end 26.

With the fixed jaw 12 fixed at the first end 26, as it is shown in the figures, a clamping function is realized. When the fixed jaw 12 is fixed at the second fixing position 28, a spreading function can be realized for the clamp 10.

The fixed jaw 12 comprises a holding region 32 which is located at the clamp bar 16 and via which the fixed jaw 12 can be (releasably) fixed to the clamp bar 16. In particular, here, a form-locking fixing is provided. The clamp bar 16 has for this purpose one or more through-openings 34.

A jaw element 36 is located at the holding region 32, which jaw element 36 is oriented transversely to the longitudinal axis 22 of the clamp bar 16 and extends away from the clamp bar 16.

Arranged at the jaw element 36 is a contact element 38 which serves to contact a workpiece.

In particular, the contact element is formed as a plastics part. It forms a kind of cap which is located at the jaw element 36.

In an embodiment, the contact element 38 is replaceable.

Figure 5:
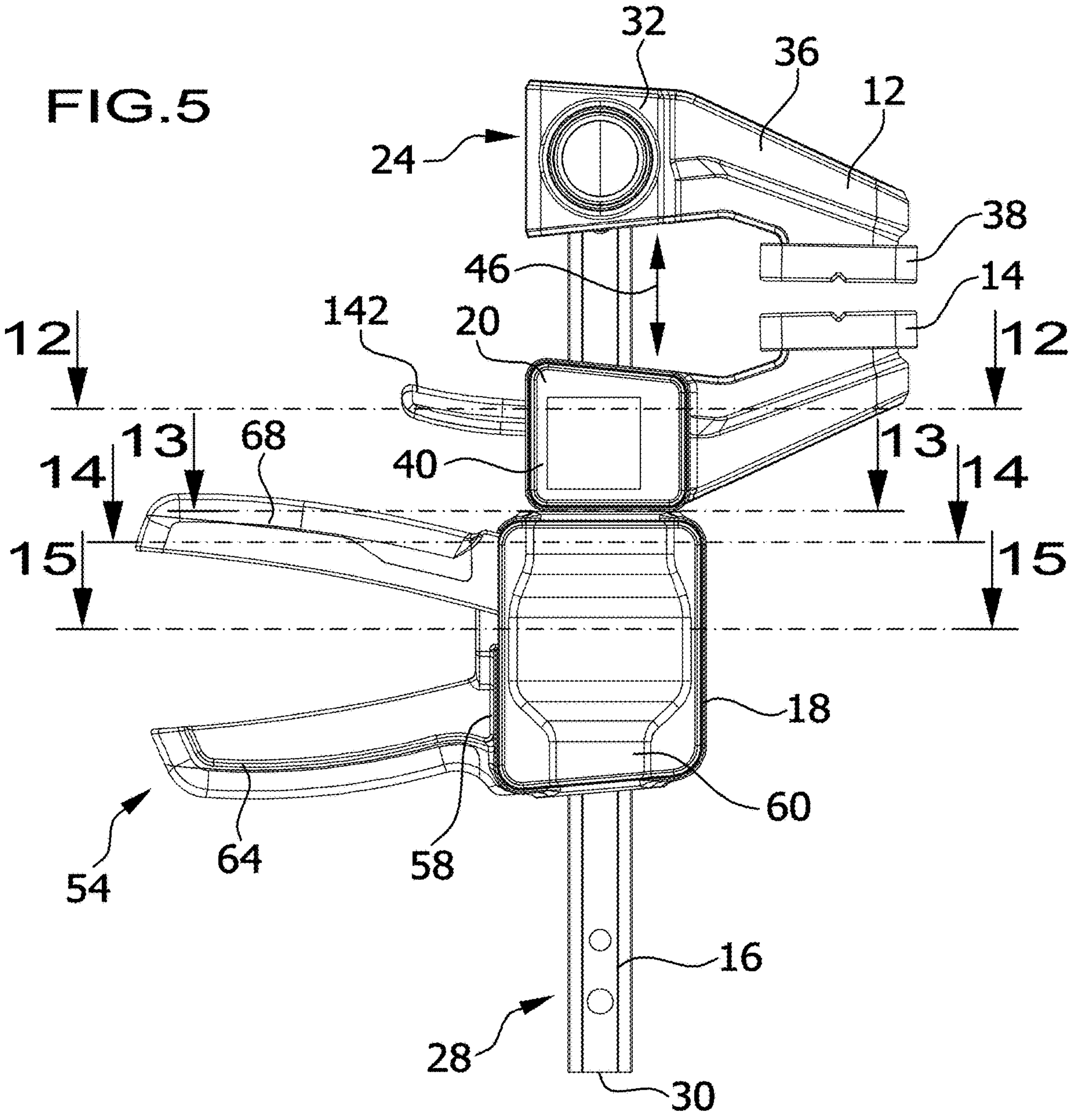
FIG. 5 shows a top plan view of the clamp of FIG. 1.
Figure 8:
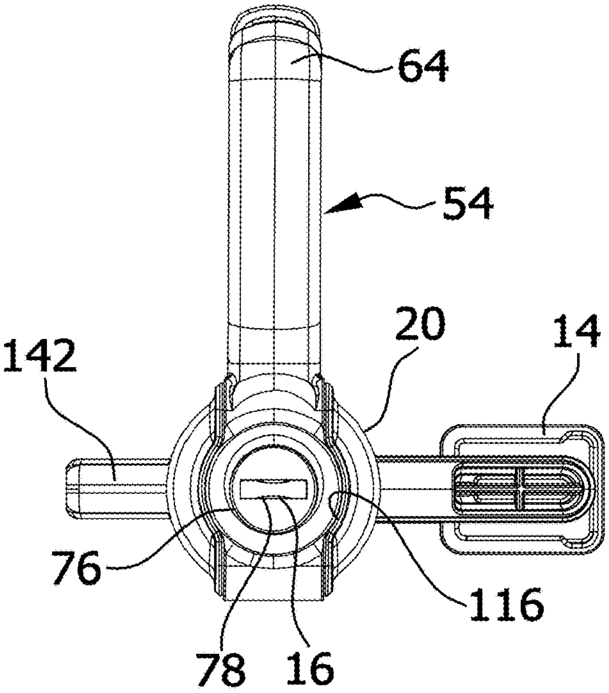
FIG. 8 shows a rear view of the clamp of FIG. 3.
Figure 9:
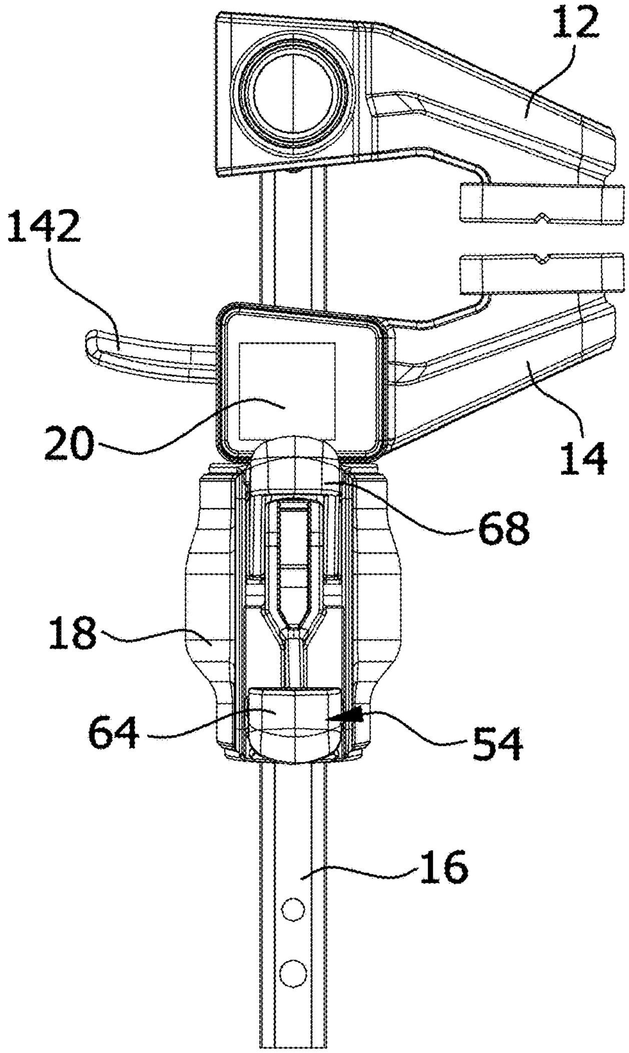
FIG. 9 shows a top plan view of the clamp of FIG. 3.
Figure 10:
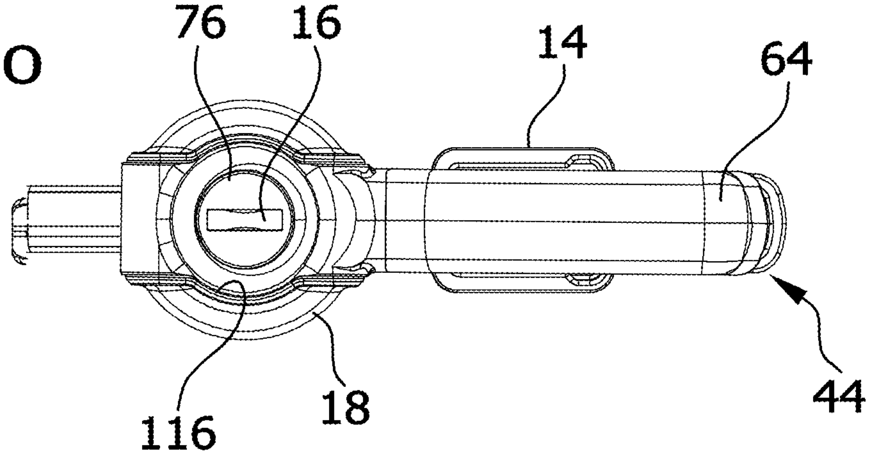
FIG. 10 shows a rear view of the clamp of FIG. 1 with the advancement apparatus in a fourth rotational position relative to the clamp bar.
Figure 11:
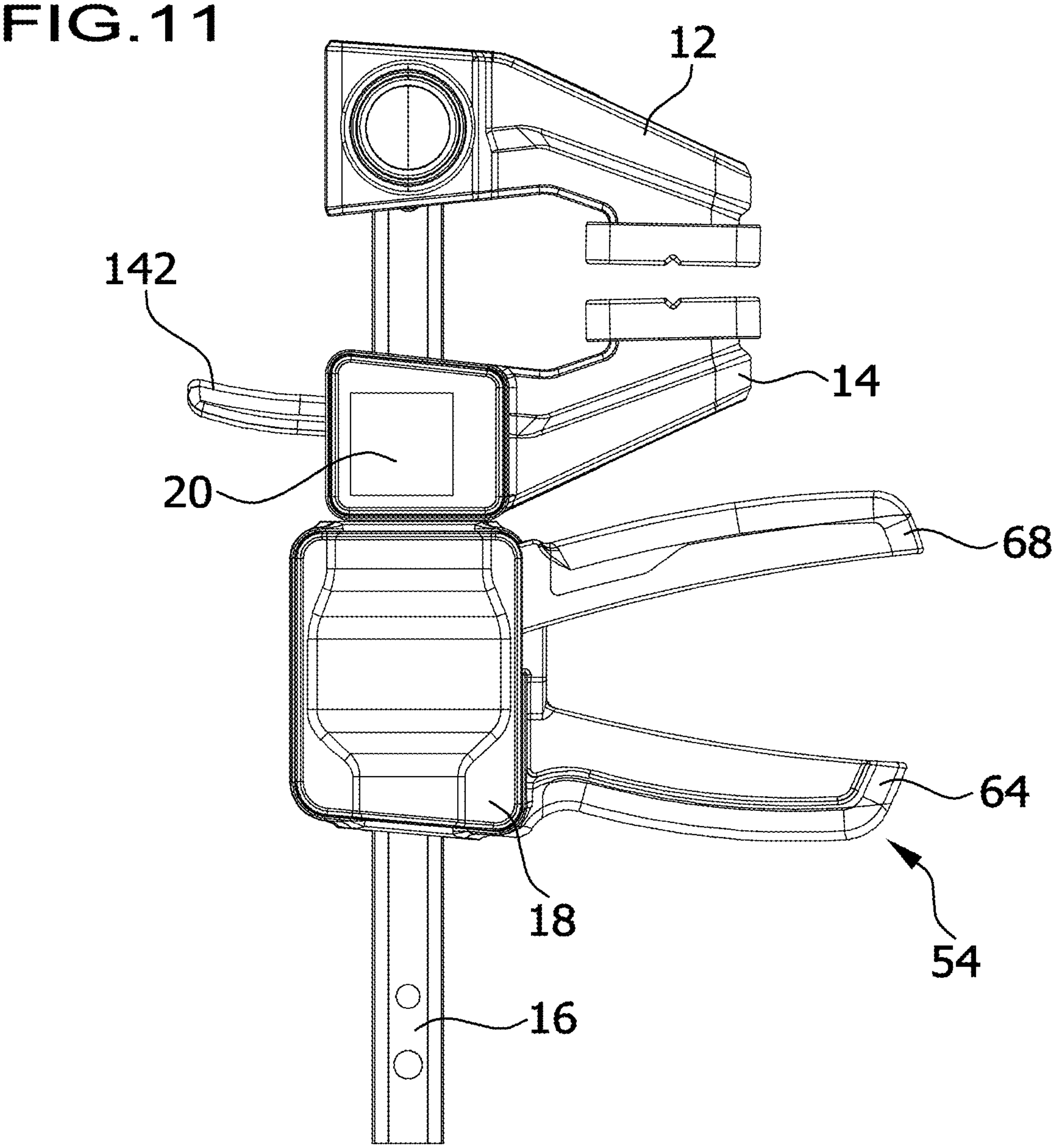
FIG. 11 shows a top plan view of the clamp of FIG. 10.
Figure 12:
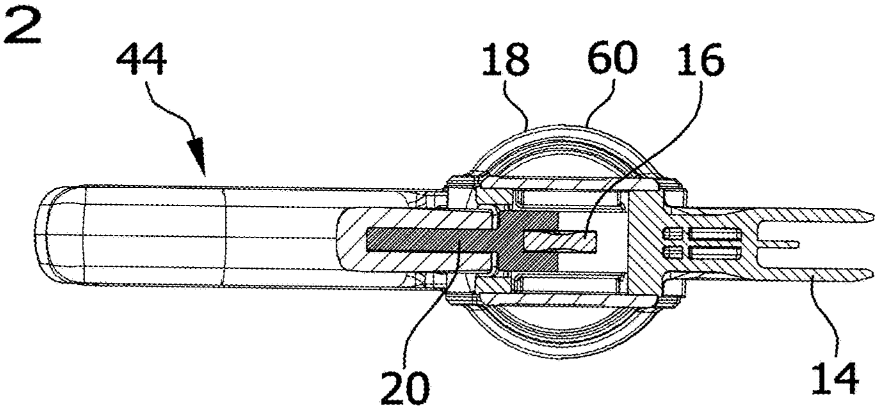
FIG. 12 shows a sectional view taken along line 12-12 of FIG. 5.
Figure 13:
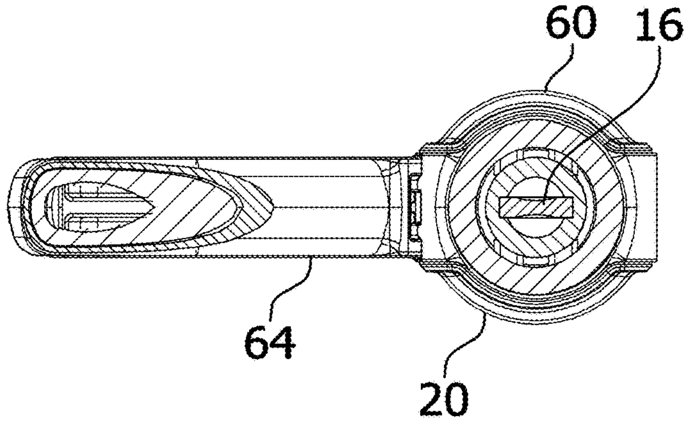
FIG. 13 shows a sectional view taken along line 13-13 of FIG. 5.
Figure 14:
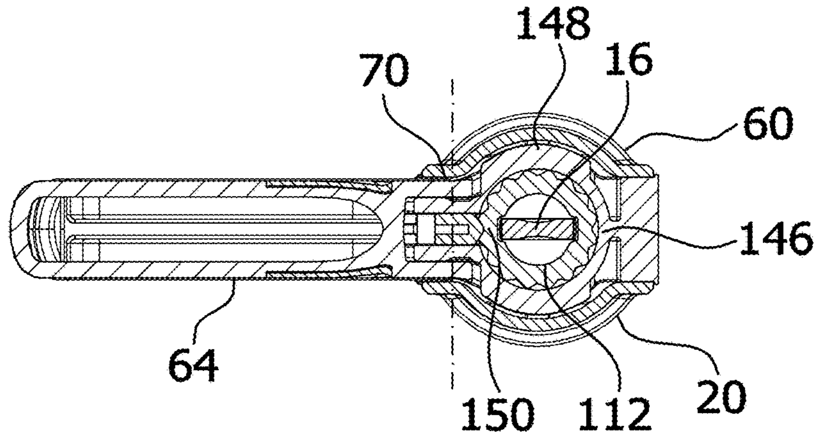
FIG. 14 shows a sectional view taken along line 14-14 of FIG. 5.
Figure 15:
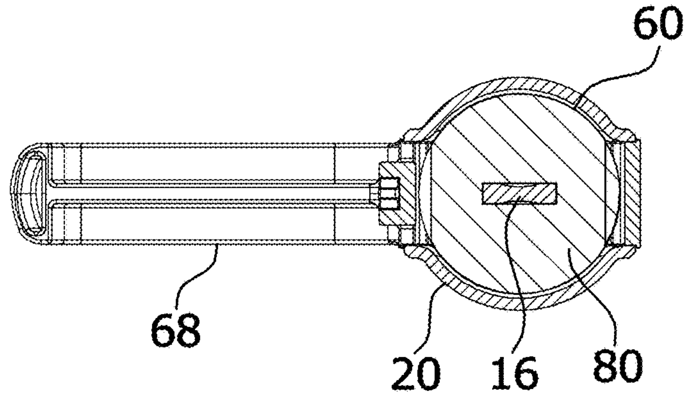
FIG. 15 shows a sectional view taken along line 15-15 of FIG. 5.

The clamp 10 has the contact element 38 located in an offset relation to the holding region 32, relative to the longitudinal axis 22 (see, for example, FIG. 5). The contact element 38 is further from the first end 26 than is the holding region 32, relative to the longitudinal axis 22.

The contact element 38 is in spaced relation to the clamp bar 16.

The counter jaw 14 is held to the clamp bar 16 via a holding region 40. The blocking apparatus 20 forms the holding region 40, as will be discussed in more detail below.

A jaw element 42 is located at the holding region 40. Located at the jaw element 42 is, in turn, a contact element 44 which is basically configured identically to the contact element 38 of the fixed jaw 12.

The contact element 44 of the counter jaw 14 is aligned with the contact element 38 of the fixed jaw 12. An alignment line is parallel to the clamp bar 16.

Via the fixed jaw 12 and the counter jaw 14, a force can be exerted on one or more workpieces that are placed in contact against the contact elements 38, 44.

The contact element 44 is arranged in offset relation to the holding region 40, relative to a direction parallel to the longitudinal axis 22. Relative to said direction, the contact element 44 is closer to the first end 26 than is the holding region 40.

The clamp bar 16 is guided for displacement on the holding region 40 (of the blocking apparatus 20). A displacement direction 46 (direction and counter direction) is parallel to the longitudinal axis 22.

Via displacement of the clamp bar 16 in the displacement direction 46, a distance between the contact elements 38 and 44 can be varied, and a force can be applied on one or more workpieces.

When in a clamping function (as it is depicted in the drawings), the fixed jaw 12 can be moved towards the counter jaw 14 via displacement of the clamp bar 16 in order to exert a clamping force on one or more workpieces between the contact elements 38 and 44.

Furthermore, to cancel a clamping action, the fixed jaw 12 can be moved away from the counter jaw 14 by corresponding displacement of the clamp bar 16. This will be explained in more detail below.

The advancement apparatus 18 serves to actively advance the clamp bar 16. The advancement apparatus 18 comprises a drive mechanism for the clamp bar 16. Furthermore, the advancement apparatus 18 serves to hold the clamp 10. In particular, the clamp 10 is configured as a one hand operated clamp which can be held by a holding hand, wherein an advance movement by way of the advancement apparatus can also be actuated via the holding hand.

Figure 17:
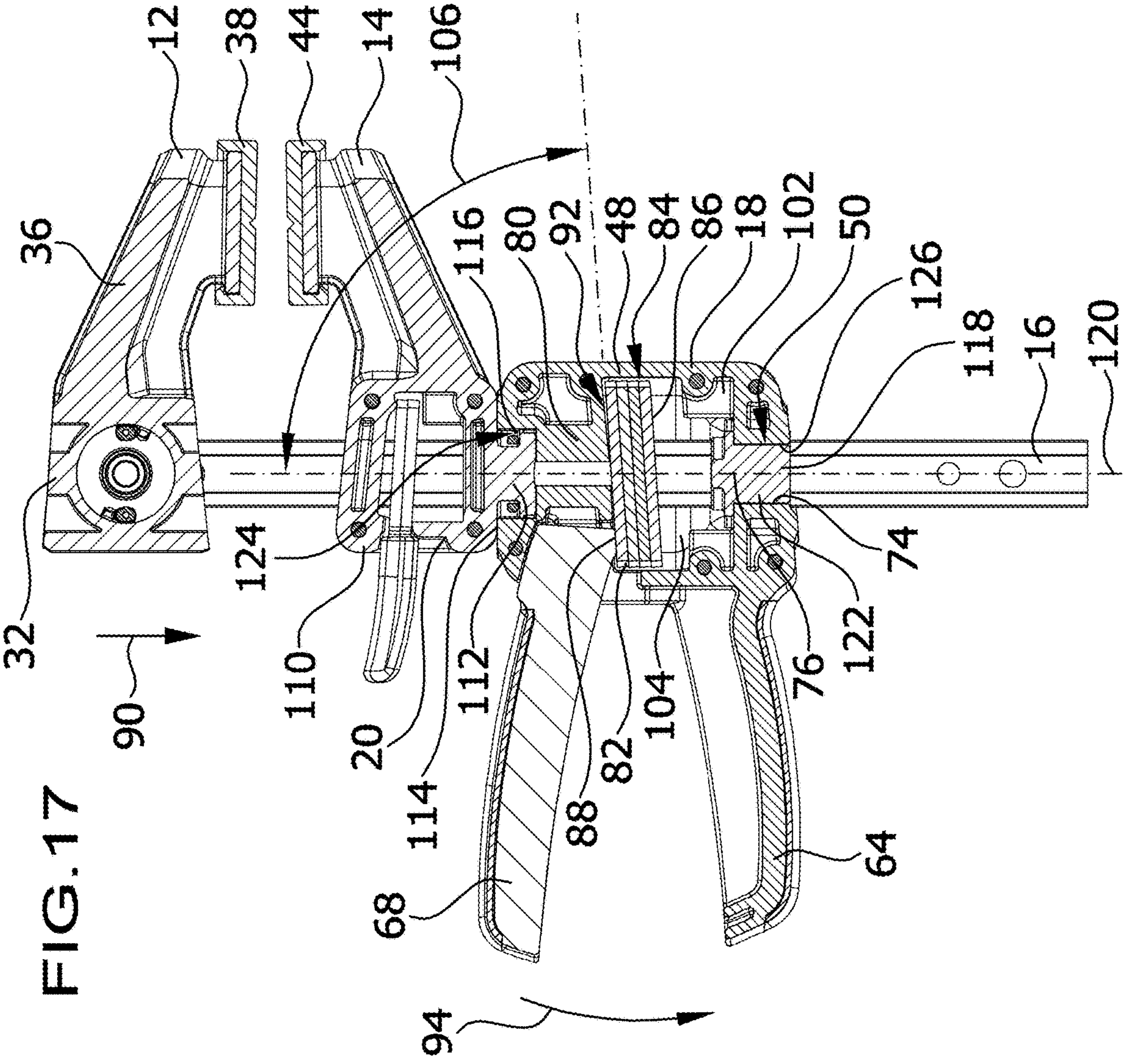
FIG. 17 shows a sectional view taken along line 17-17 of FIG. 4.
Figure 16:
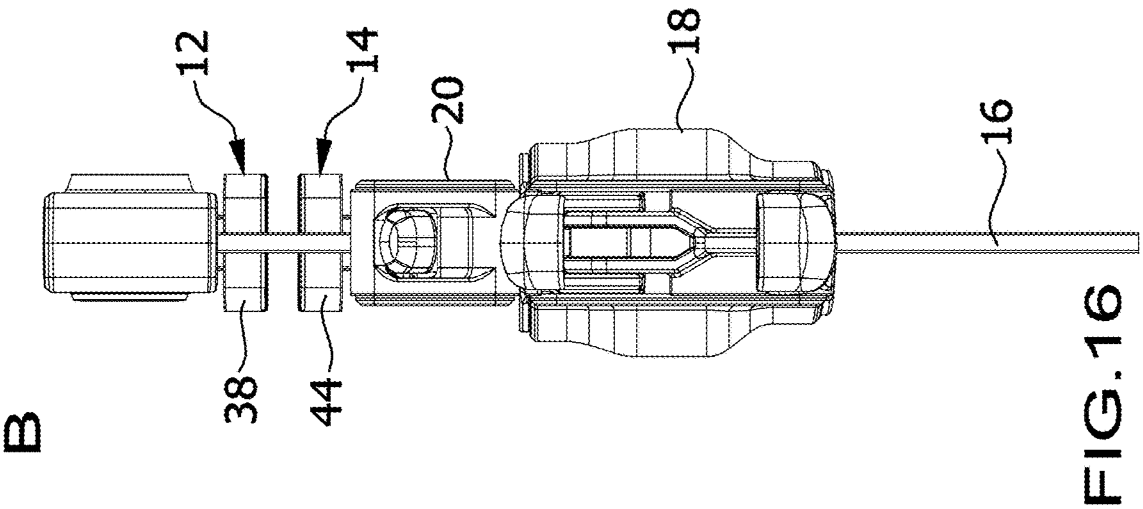
FIG. 16 shows a top plan view of the clamp of FIG. 1 in the direction B of FIG. 1.
Figure 18:
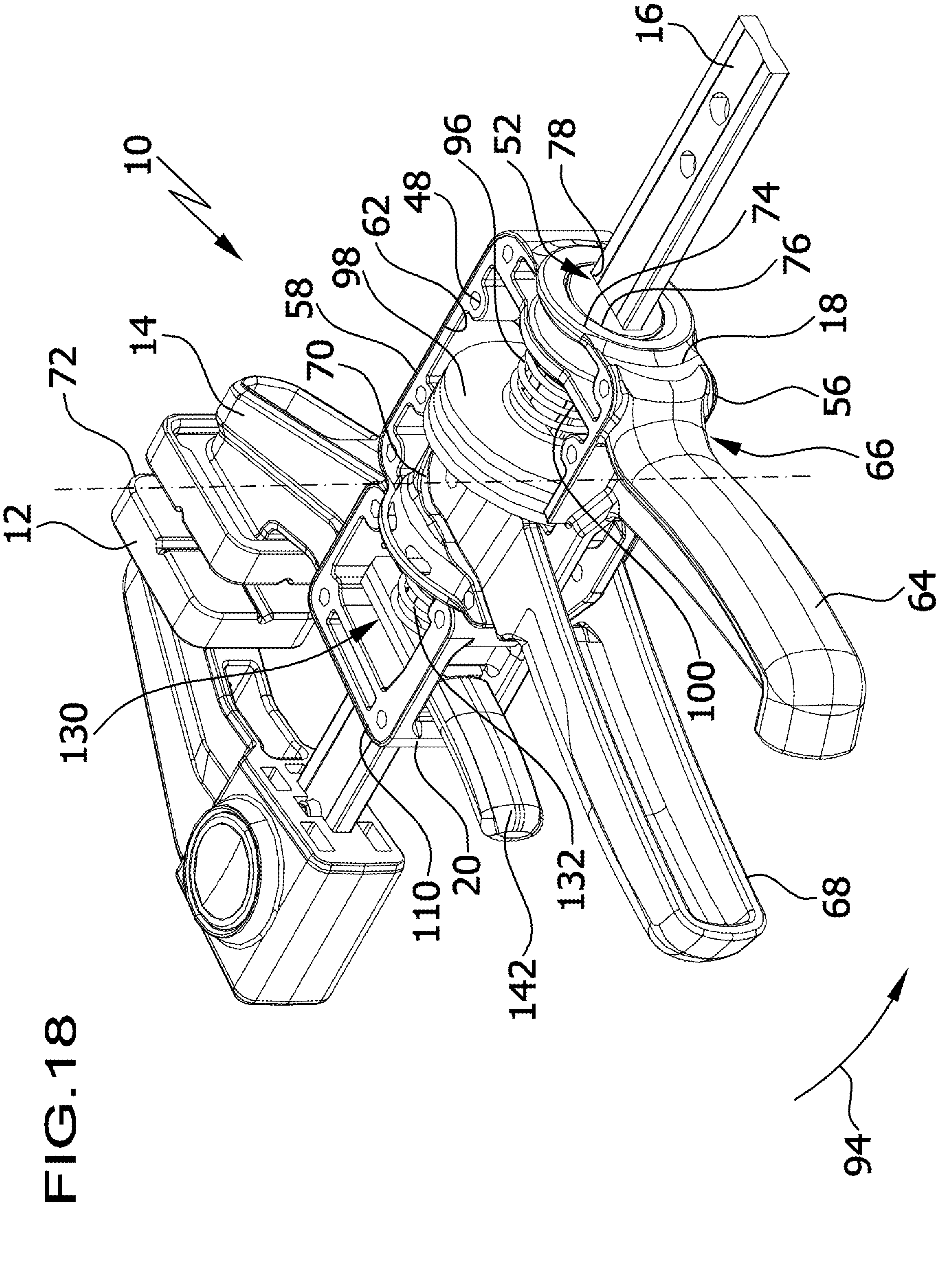
FIG. 18 shows a perspective representation corresponding to FIG. 1, wherein housing covers have been removed.

The advancement apparatus 18 comprises a housing 48 (see FIGS. 17, 18 for example). The clamp bar 16 is supported on the advancement apparatus 18, and therefore on the housing 48, for displacement in the displacement direction 46 via a displacement guide 50. In particular, the displacement guide 50 is configured as a slide guide and comprises a sliding bearing device 52.

The blocking apparatus 20, and hence the holding region 40, is connected to the housing 48 (and therefore to the advancement apparatus 18). The blocking apparatus 20 and the advancement apparatus 18 form a unit relative to which the clamp bar 16 is displaceably supported. The sliding bearing device 52 is arranged at the blocking apparatus 20 (the holding region 40) and the housing 48. The blocking apparatus 20 and the advancement apparatus 18 are connected in translationally fixed relation to one another.

As will be explained in more detail below, the advancement apparatus 18 is rotatable relative to the blocking apparatus 20, and the advancement apparatus 18 is rotatably supported on the blocking apparatus 20.

An actuating device 54 is arranged at the housing 48. The actuating device 54 serves to hold the clamp 10 by a holding hand of an operator and to activate an advance movement of the clamp bar 16 by an operator via the advancement apparatus 18.

The housing 48 has an approximately cuboid shape or cylindrical shape comprising a bottom 56, a wall 58 arranged at the bottom 56 and projecting transversely therefrom, and a cover 60 (compare FIG. 18; the cover 60 has been removed in FIGS. 18 through 22).

The wall 58 extends all around in a continuous configuration except for a passage area for the clamp bar 16. With the cover 60 in place, the housing 48 is closed and has an interior space 62 (compare FIG. 18).

The actuating device 54 comprises a holding element 64 (gripping element) which is located at the wall 58 and, here, is located at a wall part of the wall 58 which is spaced apart from the clamp bar 16 in a direction transverse to the longitudinal axis 22. Said wall part is oriented at least approximately parallel to the clamp bar 16.

The holding element 64 is stationarily (that is, immovably) arranged at the housing 48. By way of example, the holding element 64 is formed in one piece with the wall 58. The holding element 64 is located in a rear area 66 of the housing 48 which is closer to the second end 30 of the clamp bar 16 than it is to the first end 26 of the clamp bar 16.

The holding element 64 extends outwardly away from the wall 58 in a direction transverse to the longitudinal axis 22 of the clamp bar 16. It is arranged and configured such that a holding hand can grasp therearound and that it can be gripped by an operator via an inside part of the operator's hand. An operator can hold the clamp 10 as a whole via the holding element 64.

The actuating device 54 further comprises an actuating lever 68 which is located at the housing 48. The actuating lever 68 is supported by a pivot bearing 70 for pivotal movement about a pivot axis 72 (compare, for example, FIG. 4).

The pivot axis 72 is oriented transversely and in particular perpendicularly to the longitudinal axis 22 of the clamp bar 16.

The actuating lever 68 is arranged in spaced apart relation to the holding element 64 and, here, is positioned such that an operator when holding the clamp 10 by the holding element 64 can contact the actuating lever 68 by fingers of the holding hand and can thereby pivot the actuating lever 68 about the pivot axis 72 and, in particular, pivot same in a direction towards the holding element 64.

The wall 58 of the housing 48 has an opening 74, which opening 74 is formed in a wall part of the wall 58 that is oriented transversely to the wall part at which the holding element 64 is located.

A first sleeve 76 is located at the opening 74. Here, the first sleeve 76 is rotationally fixed relative to the clamp bar 16. The first sleeve 76 has a first opening 78 (compare FIG. 18) through which the clamp bar 16 is passed. The first opening 78 conforms to the profiling of the clamp bar 16 and is configured such that the clamp bar 16 is only displaceably, but not rotatably, guided at the first opening 18. The first sleeve 76 having the first opening 78 forms part of the sliding bearing device 52.

The first sleeve 76 is located at and in particular in the housing 48.

A contact region 80 is formed in the housing 48 (in the interior space 62 of the housing 48), above the pivot bearing 70 (compare FIG. 17). The clamp bar 16 is passed through the contact region 80.

The contact region 80 serves to receive in contact thereagainst an advance element 82.

Arranged in the interior space 62 is an advance element pack 84 which comprises a plurality of advance elements 82.

An advance element 82 is formed as a sheet metal part for example.

Here, adjacent advance elements 82 contact one another. Each advance element 82 has an opening 86 through which the clamp bar is passed.

The advance element pack 84 is configured such that the actuating lever 68 can act on the advance element pack 84 when pivoting in a direction towards the holding element 64. In particular, the actuating lever 68 acts by a nose 88 thereof (compare, for example, FIG. 17) on the advance element 82 as the first advance element which lies next to the contact region 80 in the advance element pack 84.

The advance element pack 84 is configured such that it is cantable relative to the clamp bar 16 and driveable via the actuating lever 68, wherein the clamp bar 16 is then displaced in an advance direction 90. The advance direction 90 is a direction of the displacement direction 46. In a clamping function of the clamp 10, in which the fixed jaw 12 is arranged in the area of the first end 26 (FIGS. 1 to 22), the advance direction 90 is a direction of movement of the clamp bar 16 in which the fixed jaw 12 moves in a direction towards the counter jaw 14 (see, for example, FIG. 17).

Starting from an initial position of the advance element pack 84 (compare, for example, FIG. 17), the clamp bar 16 can be moved by an operator via the actuating lever 68. The initial position 92 here is a position in which the advance element pack 84 is, with its outer advance element 82, in contact against the contact region 80. In the initial position 92 of the advance element pack 84, the clamp bar 16 is free to move on the advancement apparatus 18 (when the blocking apparatus 20 is not considered).

In the initial position 92 of the advance element pack 84, the actuating lever 68 is also in an initial position, in which initial position the actuating lever 68 is maximally spaced from the holding element 64. Starting from this initial position, the actuating lever 68 can be pivoted in a pivoting direction 94 (FIG. 17) towards the holding element 64.

A spring device 96 is provided (compare, for example, FIG. 18), which is supported on the advance element pack 84 and hence on the advance element 98 which is an outer advance element and faces away from the advance element 82. The spring device 96 is further supported on the first sleeve 76 or on a wall 100 in the housing 48, wherein the wall 100 is located at the sleeve 76.

The spring device 96 is arranged and configured such that it attempts to urge the advance element pack 84 to its initial position 92 against the contact region 80. To pivot the actuating lever 68 in the pivoting direction 94, an operator must overcome the spring force of the spring device 96. When an operator releases the actuating lever 68, then the spring device 96 urges the advance element pack 84 to its initial position 92.

The interior space 62 of the housing 48 can have associated therewith an upper part 102 and a lower part 104 (compare FIG. 17). The lower part 104 and the upper part 102 are separated by the clamp bar 16 which extends through the housing 48. The actuating device 54 is arranged adjacent to the lower part 104, at the housing 48.

The nose 88 of the actuating lever 68 is positioned in the lower part 104; it acts there on the advance element pack 84.

Starting from the initial position 92, pivoting of the actuating lever 68 in the pivoting direction 94 effects canting of the advance element pack 84 relative to the clamp bar 16 by virtue of the nose 88 engaging the advance element pack 84. In this pivoting movement, the actuating lever 68 first causes a change in the angular position of the advance element pack 84 relative to the clamp bar 16. This leads to canting of the advance element pack 84 relative to the clamp bar 16.

In the illustrated exemplary embodiment (compare, for example, FIG. 17), the advance element pack 84 in the initial position 92 has an angular position 106 to the longitudinal axis 22 which is approximately 90°, relative to a surface of the advance element 82.

In the illustrated embodiment (FIG. 17), the corresponding angle 106 is somewhat less than 90°, wherein the advance element pack in the initial position 92 is inclined away from the counter jaw 14. The corresponding openings of the advance elements of the advance element pack 84 are arranged and formed such that, even with this inclination, free displaceability of the clamp bar 16 on the advancement apparatus 18 is still provided (when the blocking apparatus 20 is not considered).

Pivoting the actuating lever 68 in a direction towards the holding element 64 causes the angle 106 to be reduced, and canting is effected. Continued pivoting of the actuating lever 68 towards the holding element 64 effects drive of the clamp bar 16 and linear displacement thereof in the advance direction 90.

As the angle of the advance element pack 84 changes when pivoting the actuating lever 68, the advance element pack 84 can, in an embodiment, be supported on the contact region 80 in the upper part 102 of the housing 48.

An eccentric is formed by the actuating lever 68 including the nose 88, the advance element pack 84, and the contact region 80.

In particular, the pivot bearing 70 is arranged and configured such that the pivot axis 72 pierces the clamp bar 16 (compare FIG. 18). Thus, the pivot axis 72 is located between the upper part 102 and the lower part 104, and the nose 88 engages the advance element pack 84 in offset relation to the pivot axis 72.

Figure 19:
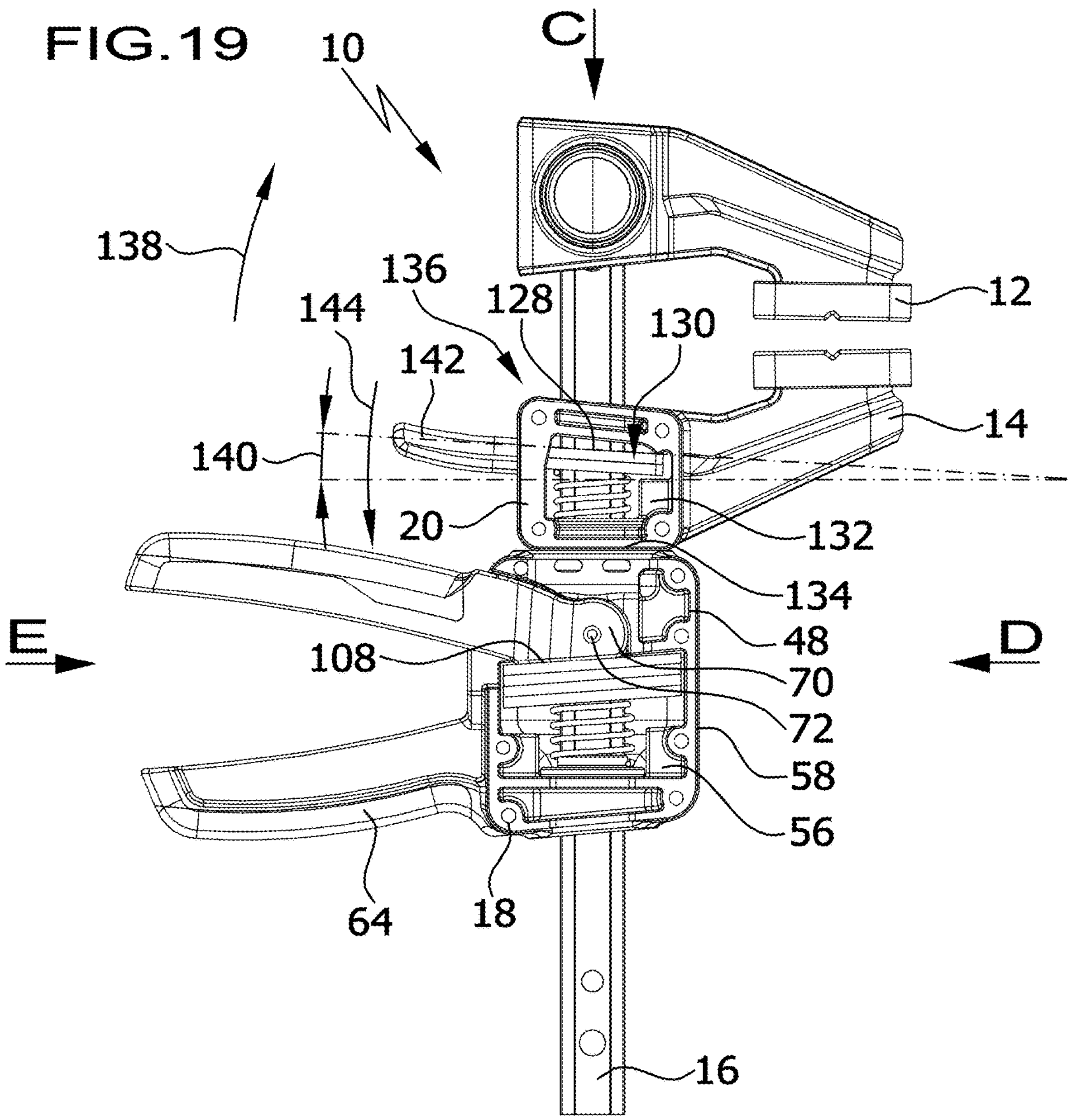
FIG. 19 shows a top plan view of the clamp of FIG. 18 (with housing cover removed)
Figure 20:
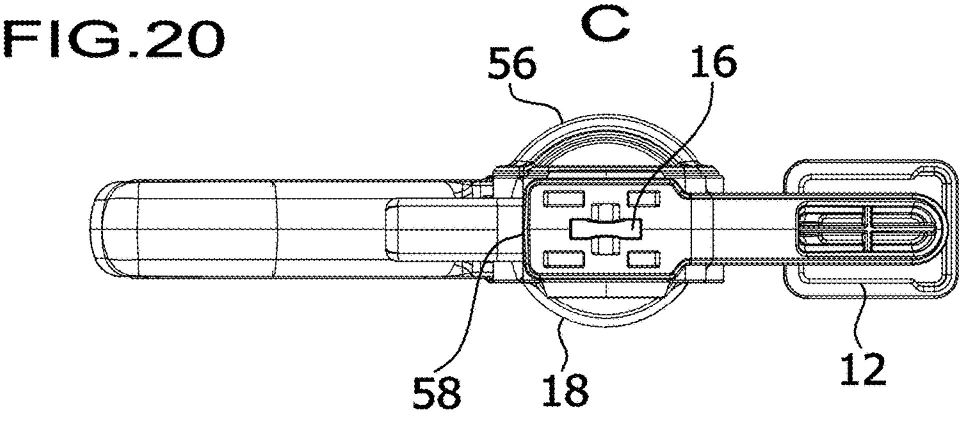
FIG. 20 shows a view in the direction C of FIG. 19.
Figure 21:
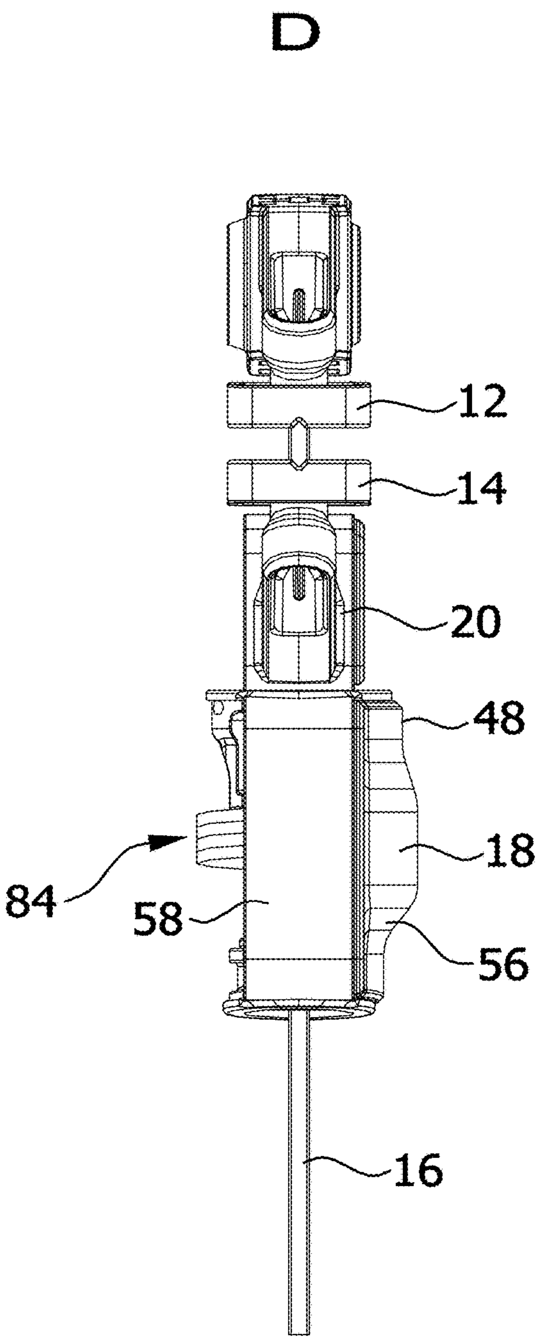
FIG. 21 shows a view in the direction D of FIG. 19.
Figure 22:
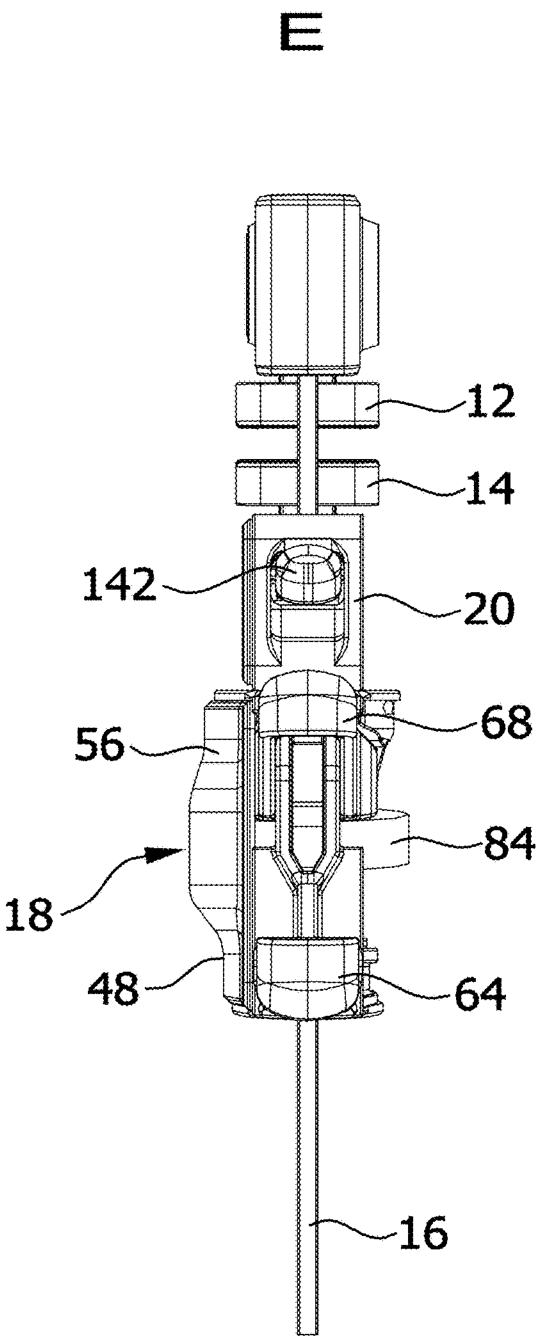
FIG. 22 shows a view in the direction E of FIG. 19.

The advance element pack 84 has, at the first advance element 82 thereof, an engagement surface 108 for the nose 88 (compare FIG. 19). The engagement surface 108 is of ring-shaped configuration and, in particular, surrounds the clamp bar 16 in the shape of a ring. A rotatable advancement apparatus 18 can thereby be realized in which the actuating device 54, by the actuating lever 68, can be rotated relative to the clamp bar 16, wherein the advance element pack 84 is not co-rotated therewith, while the nose 88 can still act on the advance element pack 84 in each rotational position of the actuating device 54 relative to the clamp bar 16; this will be explained in more detail below.

In an exemplary embodiment, the engagement surface 108 is formed as a circular ring.

In particular, the advance elements of the advance element pack 84 are formed as ring disks.

The blocking apparatus 20 also comprises a housing 110 on which the clamp bar 16 is displaceably arranged. The housing 110 forms the holding region 40. The clamp bar 16 is passed through the housing 110.

Located at the housing 110 is a second sleeve 112 (compare, for example, FIG. 17) which has an opening through which the clamp bar 16 is passed. The second sleeve 112 is part of the sliding bearing device 52.

The second sleeve 112 projects beyond a side 114 of the housing 110, wherein the side 114 faces towards the housing 48 of the advancement apparatus 18. The second sleeve 112 is entered in a corresponding receiver 116 of the housing 48 of the advancement apparatus 18.

The housing 110 is rotationally fixed relative to the clamp bar 16 and is translationally fixed relative to the advancement apparatus 18.

The advancement apparatus 18 with the housing 48 and the actuating device 54 is rotatable relative to the clamp bar 16 via a rotary bearing 118 and, here, is rotatable relative to the counter jaw 14 and the fixed jaw 12. A rotational axis 120 of the rotary bearing 118 is parallel to the longitudinal axis 22 and is therefore also parallel to the displacement direction 46.

The pivot axis 72 of the pivot bearing 70 of the actuating lever 68 is transverse and in particular perpendicular to the rotational axis 120.

The pivot bearing comprises a first rotary bearing 122 having a first rotational axis which is formed by way of the first sleeve 76. The first sleeve 76 is located at a receiver 126 of the housing 48, wherein the housing 48 together with the receiver 126, in a sense, forms an outer shaft. The first sleeve 76 is rotationally fixed relative to the clamp bar 16 (wherein the clamp bar 16 is supported for slidable displacement on the first sleeve 76), and the housing 48 is supported for rotation about the rotational axis 120 on the first sleeve 76, at the receiver 126.

The second sleeve 112 is positioned opposite the first sleeve 76. A second rotary bearing 124 of the rotary bearing 118 is formed by way of the receiver 116, the second rotary bearing 124 having a second rotational axis. The first rotational axis and the second rotational axis coincide and form the rotational axis 120.

In the area of the second sleeve 112, the housing 48 together with the receiver 116 also forms a kind of outer shaft.

The advance element pack 84 is positioned in the interior space 62 of the housing 48, between the first sleeve 76 and the second sleeve 112.

The housing 48 of the advancement apparatus 18 is rotatably connected to the blocking apparatus 20 by way of the second rotary bearing 124. Here, the advancement apparatus 18 and the blocking apparatus 20 form a unit relative to which the clamp bar 16 is displaceable in the displacement direction 46. In particular, the second rotary bearing 124 is configured such that a translationally fixed connection exists between the advancement apparatus 18 and the blocking apparatus 20 via the combination of the receiver 116 and the second sleeve 112.

By way of example, an annular formation is formed at the second sleeve 112 into which enters a ridge which is formed at the housing 48, and is formed at the cover 60 in particular, in order to achieve a translationally fixed connection.

In the exemplary embodiment as shown and described, the second sleeve 112 is formed at the housing 110 of the blocking apparatus 20. It is also possible in principle for a corresponding sleeve to be arranged or formed at the housing 48 of the advancement apparatus 18, which sleeve is then entered in a corresponding receiver of the housing 110. In this case, an inner shaft is formed, by way of the second sleeve, for the rotatability of the housing 48.

The advancement apparatus 18 is configured such that a rotatability of the actuating device 54 exists relative to the fixed jaw 12 and the counter jaw 14. The advance element pack 84 is rotationally fixed relative to the clamp bar 16. When the housing 48 is rotated about the rotational axis 120, the nose 88 of the actuating lever 68 rotates about the rotational axis 120 and engages the engagement surface 108 at different locations depending on the rotational position. This is made possible because of the ring-shaped configuration of the engagement surface 108.

By the configuration of the advancement apparatus 18 as described, an advance movement of the clamp bar 16 in the advance direction 90 can be activated in each rotational position of the actuating device 54 about the rotational axis 120 by an operator via the actuating lever 68.

Arranged in the housing 110 of the blocking apparatus 20 is at least one blocking element 128, and in particular a blocking element pack 130.

In the exemplary embodiment as shown, the blocking element pack comprises two blocking elements 128 which, lying one above the other, contact one another.

A blocking element 128 has a through-opening through which the clamp bar 16 is passed. Here, the blocking element 128 is in rotationally fixed relation to the clamp bar 16.

The blocking element pack 130 is supported via a spring device 132 (compare FIG. 19). The spring device is supported on a wall 134 and on the blocking element pack 130. Here, the wall 134 faces towards the housing 48.

The blocking element pack 130 has a blocking position 136 (see, for example, FIG. 19) in which the blocking element pack 130 is canted relative to the clamp bar 16. A force provided by the spring device 132 urges the blocking element pack 130 into the blocking position.

In the blocking position 136, displacement of the clamp bar 16 in a direction 138 opposite to that of the advance direction 90 is blocked (compare, for example, FIG. 19). Displacement in the advance direction 90, however, is not blocked by the blocking element pack 130.

The blocking element pack 130 has, in the blocking direction, an inclination at an angle 140 to a perpendicular to the longitudinal axis 22 of the clamp bar 16 (compare FIG. 19), wherein said inclination opposes the inclination of the advance element pack 84 when the latter is canted relative to the clamp bar 16, in order for such blocking of a displaceability in the counter direction 138 relative to the advance direction to be achieved.

A release lever 142 is connected to the blocking element pack 130. An operator can engage the release lever 142 and pivot same in a direction 144 which is oriented in a direction towards the second end 30 of the clamp bar 16. Here, the operator must overcome the spring force of the spring device 132.

Correspondingly, the blocking element pack 130 is supported on an interior region of the housing 110 in order to enable such pivotability.

Pivoting the release lever 142 in the direction 144 varies the angle of the blocking element pack 130 to the longitudinal axis 22 of the clamp bar. The angle is reduced, that is, its orientation approaches nearer to an orthogonal orientation. This releases the displaceability of the clamp bar 16 in the openings of the blocking element pack 130 in order to allow such displacement.

The release lever 142 projects beyond the housing 110 on one side thereof.

The clamp 10 has an initial position (FIG. 1) in which the release lever 142 is on the same side as the actuating device 54. In particular, the release lever 142 is then arranged and configured such that, when an operator holds the clamp 10 by the actuating device 54, the operator can access the release lever 142 by one or more fingers of the operator's holding hand.

It is possible in principle for the rotary bearing 118 to be configured such that stepless rotatability about the rotational axis 120 is enabled.

Once adjusted, a rotational position is maintained, and is in particular maintained in a force-locking manner because of the spring force provided by the spring device 132.

In an alternative embodiment, provision is made for a plurality of discrete rotational positions to be provided. To this end, for example, the second sleeve 112 is provided with a latching rim 146 (compare FIG. 14); the latching rim 146 has a plurality of elevations 148 which are spaced apart from one another.

Provided at the housing 48 is a counter element 150 (FIG. 14) of the latching rim 146. The counter element 150 is provided for entering into an area ("valley") between adjacent elevations 148. A certain rotational position of the housing 48 relative to the second sleeve 112 is then secured by way of a form-locking connection.

Application of increased force will be required to effect movement out of such an adjusted rotational position. The application of increased force is required to correspondingly move the counter element 150 out of the area between adjacent elevations 148.

In an exemplary embodiment, the counter element 150 is displaceably supported on the housing 48 and is spring-supported thereon. A spring force urges the counter element 150 against the latching rim 146 and, at a secured rotational position, into the area between adjacent elevations 148. To release such rotational position, i.e., to move the counter element 150 out of the area between adjacent elevations 148, the counter element 150 must be displaced against the spring force, i.e., the spring force must be correspondingly overcome. This is accomplished by an operator who must exert a corresponding amount of force when effecting rotation.

The clamp 10 in accordance with the invention works as follows:

The fixed jaw 12, the counter jaw 14, and the blocking apparatus 20 are arranged in rotationally fixed relation to the clamp bar 16. The housing 48 of the advancement apparatus 18 and the actuating device 54 are, via the rotary bearing 118, rotatable about the rotational axis 120 relative to the clamp bar 16 and hence also relative to the fixed jaw 12, the counter jaw 14, and the blocking apparatus 20.

As shown in FIGS. 1 to 11 (see FIGS. 1 to 3 in particular), an operator can bring the actuating device 54 into the rotational position relative to the fixed jaw 12 or the counter jaw 14 that is beneficial or desirable for the operator depending on the particular application. With this rotatability, the alignment of the jaws 12, 14 with one another is preserved. The blocking apparatus 20 does not co-rotate.

In each rotational position of the actuating device 54, an operator can effect, via the advancement apparatus 18, an advance action of the clamp bar 16 in order, when in the clamping function, to move the fixed jaw 12 towards the counter jaw 14, or to clamp one or more workpieces between the fixed jaw 12 and the counter jaw 14.

This is ensured by the ring-shaped engagement surface 108.

The blocking element pack 130 will be in the blocking position 136 under the action of force of the spring device 132, requiring no operator intervention on the release lever 142. This means that a displaceability of the clamp bar 16 in the counter direction 138 to the advance direction 90 is blocked.

When an operator actuates (imparts a pivoting movement to) the actuating lever 68, the actuating lever 68 acts on the advance element pack 84, and this then displaces the clamp bar 16 in the advance direction 90, as has been described in the foregoing. Counter displacement is blocked by the blocking element pack 130 in the blocking position 136.

By actuating the release lever 142 with pivoting same in the direction 144, the blocking condition at the blocking apparatus 20 can be removed, and a corresponding free displaceability of the clamp bar 16 on the blocking apparatus 20 (and also on the advancement apparatus 18 if the actuating lever 68 is not actuated) is enabled.

In the solution in accordance with the invention, the blocking apparatus 20 and the advancement apparatus 18 are decoupled from each other in the sense that, even in the blocking position 136 of the blocking element pack 130, rotatability of the actuating device 54 about the rotational axis 120 is enabled, and advancement actuation at the advancement apparatus 18 is enabled.

In the described exemplary embodiment, the advance direction 90 is such that the fixed jaw 12 is movable towards the counter jaw 14, and one or more workpieces are clampable between the fixed jaw 12 and the counter jaw 14.

The contact element 38 and 44 face towards one another.

In an exemplary embodiment, it is possible for the fixed jaw 12 to be fixed at the second fixing position 28. In particular, the fixing is realized in such a way that the contact elements 38 and 44 then face away from each other.

In this case, an advance action in the advance direction 90 of the clamp bar 16 causes the fixed jaw 12 and the counter jaw 14 to move away from each other. A spreading function is thereby realized. A spreading force can be applied to one or more workpieces.

In the clamping function of the clamp 10 (FIGS. 1 to 21), the blocking apparatus 20 is positioned at the clamp bar 16 between the fixed jaw 12 and the advancement apparatus 18.

If the clamp 10 is converted to enable realizing the spreading function, the advancement apparatus 18 is positioned between the blocking apparatus 20 and the fixed jaw 12.

LIST OF REFERENCE CHARACTERS

10 clamp
12 fixed jaw
14 counter jaw
16 clamp bar
18 advancement apparatus
20 blocking apparatus
22 longitudinal axis
24 first fixing position
26 first end
28 second fixing position
30 second end
32 holding region
34 opening
36 jaw element
38 contact element
40 holding region
42 jaw element
44 contact element
46 displacement direction
48 housing
50 displacement guide
52 sliding bearing device
54 actuating device
56 bottom
58 wall
60 cover
62 interior space
64 holding element
66 rear area
68 actuating lever
70 pivot bearing
72 pivot axis
74 opening
76 first sleeve
78 first opening
80 contact region
82 advance element
84 advance element pack
86 opening
88 nose
90 advance direction
92 initial position
94 pivoting direction
96 spring device
98 advance element
100 wall
102 upper part
104 lower part
106 angular position
108 engagement surface

110 housing
112 second sleeve
114 side
116 receiver
118 rotary bearing
120 rotational axis
122 first rotary bearing
124 second rotary bearing
126 receiver
128 blocking element
130 blocking element pack
132 spring device
134 wall
136 blocking position
138 counter direction
140 angle
142 release lever
144 direction
146 latching rim
148 elevation
150 counter element

What is claimed is:

1. Clamp, comprising:
- a clamp bar;
- a fixed jaw which is located at the clamp bar;
- a counter jaw relative to which the clamp bar is displaceable;
- an advancement apparatus on which the clamp bar is displaceably supported and to which the counter jaw is connected in translationally fixed relation;
- an actuating device which is arranged at the advancement apparatus and by way of which displacement of the clamp bar in an advance direction is actuatable; and
- a blocking apparatus by way of which displacement of the clamp bar in a counter direction to the advance direction is blockable;
- wherein the actuating device is rotatable relative to the clamp bar and is rotatable relative to the blocking apparatus, and wherein the blocking apparatus is rotationally fixed relative to the clamp bar.

2. Clamp in accordance with claim 1, wherein the blocking apparatus is connected to the advancement apparatus in translationally fixed relation thereto and the clamp bar is displaceable relative to the blocking apparatus.

3. Clamp in accordance with claim 1, wherein the clamp bar is displaceably supported on the blocking apparatus.

4. Clamp in accordance with claim 1, wherein at least one of the following is provided:
- in a clamping function, the blocking apparatus is positioned between the fixed jaw and the advancement apparatus;
- in a spreading function, the advancement apparatus is positioned between the blocking apparatus and the fixed jaw.

5. Clamp in accordance with claim 1, wherein the counter jaw is located at the blocking apparatus, with at least one of the following:
- the counter jaw is located at the blocking apparatus in translationally fixed relation thereto;
- the counter jaw is located at the blocking apparatus in rotationally fixed relation thereto.

6. Clamp in accordance with claim 1, wherein a region of the advancement apparatus in which the actuating device is arranged, is supported for rotation on the clamp bar.

7. Clamp in accordance with claim 6, wherein a housing of the advancement apparatus is rotatably supported on the clamp bar.

8. Clamp in accordance with claim 1, wherein the advancement apparatus is rotatably supported in at least a portion thereof on the blocking apparatus.

9. Clamp in accordance with claim 1, wherein a rotational axis of the rotatability of the actuating device relative to the clamp bar is parallel to the advance direction.

10. Clamp in accordance with claim 1, wherein a rotary bearing for the rotatability of the actuating device relative to the clamp bar is of stepless configuration or has a plurality of discrete steps.

11. Clamp in accordance with claim 1, wherein at least one of the following is provided:
- a housing of the advancement apparatus is supported for rotation about a first rotational axis on the clamp bar via a first rotary bearing;
- a housing of the advancement apparatus is supported for rotation about a second rotational axis on the blocking apparatus via a second rotary bearing;
- the first rotational axis and the second rotational axis are coaxial.

12. Clamp in accordance with claim 11, wherein the first rotary bearing comprises a first sleeve having a first opening, wherein the clamp bar is passed through the first opening and is linearly displaceably and rotationally fixedly supported on the first sleeve and wherein the first sleeve is located at the housing.

13. Clamp in accordance with claim 12, wherein the first sleeve is associated with a counter element that engages the first sleeve to form discrete rotational positions, wherein (i) the first sleeve comprises a latching rim, or (ii) the counter element comprises a latching rim.

14. Clamp in accordance with claim 12, wherein the first sleeve is at least partially arranged in the housing.

15. Clamp in accordance with claim 11, wherein the second rotary bearing comprises a second sleeve having a second opening, wherein the clamp bar is passed through the second opening and is linearly displaceably and rotationally fixedly supported on the second sleeve.

16. Clamp in accordance with claim 15, wherein the second sleeve has associated therewith a counter element which engages the second sleeve for forming discrete rotational positions, wherein (i) the second sleeve comprises a latching rim, or (ii) the counter element comprises a latching rim.

17. Clamp in accordance with claim 15, wherein the second sleeve is (i) arranged at the blocking apparatus and is entered in a housing of the advancement apparatus, or is (ii) arranged at a housing of the advancement apparatus and is entered in a recess of the blocking apparatus.

18. Clamp in accordance with claim 1, wherein the advancement apparatus comprises at least one advance element on which the actuating device acts, wherein the at least one advance element is rotationally fixed relative to the clamp bar.

19. Clamp in accordance with claim 18, wherein the at least one advance element comprises an engagement surface for the actuating device, which engagement surface is formed in the shape of a ring.

20. Clamp in accordance with claim 19, wherein the engagement surface for the actuating device surrounds the clamp bar in a ring shape.

21. Clamp in accordance with claim 18, wherein the at least one advance element has a through-opening through which the clamp bar is passed in rotationally fixed relation thereto.

22. Clamp in accordance with claim 18, wherein the at least one advance element is positioned in a housing of the advancement apparatus.

23. Clamp in accordance with claim 18, wherein an advance element pack having a plurality of advance elements is provided.

24. Clamp in accordance with claim 1, wherein the actuating device comprises an actuating lever which is pivotable about a pivot axis, with at least one of the following:

the pivot axis is oriented transversely and in particular perpendicularly to the advance direction;

the pivot axis is oriented transversely and in particular perpendicularly to a rotational axis of the rotational mobility of the advancement apparatus relative to the clamp bar.

25. Clamp in accordance with claim 24, wherein the actuating device has a stationary holding element in spaced apart relation to the actuating lever.

26. Clamp in accordance with claim 24, wherein the advancement apparatus comprises at least one advance element which is engaged by the actuating lever, wherein, starting from an initial position of the at least one advance element, upon engagement by the actuating lever, the at least one advance element is inclined to the clamp bar with canting of the at least one advance element relative to the clamp bar, and the clamp bar is driven in linear displacement in the advance direction.

27. Clamp in accordance with claim 26, wherein a spring device is provided which is supported on the at least one advance element, wherein a spring force of the spring device attempts to bring or hold the at least one advance element in its initial position relative to the clamp bar.

28. Clamp in accordance with claim 1, wherein the blocking apparatus comprises a release element for releasing a blocking condition.

29. Clamp in accordance with claim 1, wherein the blocking apparatus comprises at least one blocking element, wherein the at least one blocking element has a through-opening through which the clamp bar is passed, and wherein in a blocking position of the at least one blocking element, the at least one blocking element is canted relative to the clamp bar.

30. Clamp in accordance with claim 29, wherein a spring device is provided which is supported on the at least one blocking element, wherein a spring force of the spring device attempts to bring or hold the at least one blocking element in its blocking position.

31. Clamp in accordance with claim 29, wherein a release element is provided which acts upon the at least one blocking element and via which an angular position of the at least one blocking element to the clamp bar is adjustable.

32. Clamp in accordance with claim 1, wherein at least one of the following is provided:

the fixed jaw is releasably located at the clamp bar;

a clamping function is provided in which the advance direction is a direction of movement of the fixed jaw towards the counter jaw;

a spreading function is provided in which the advance direction is a direction of movement of the fixed jaw away from the counter jaw;

the clamp bar has a plurality of fixing positions for the fixed jaw and fixing positions are located in the area of opposing ends of the clamp bar.

33. Clamp in accordance with claim 1, wherein the clamp is configured as a one hand operated clamp which is holdable by the actuating device by one hand of an operator, and in which an advance of the clamp bar is actuatable in the advance direction via the actuating device by the holding hand.

34. Clamp in accordance with claim 33, wherein a release element of the blocking apparatus is arranged and configured such that it is operable, by the holding hand of an operator who is holding the clamp by the actuating device, in at least a non-rotated position.

* * * * *